United States Patent [19]
Morrell et al.

[11] Patent Number: 6,133,386
[45] Date of Patent: Oct. 17, 2000

[54] METAL OXIDE SOLID ACIDS AS CATALYSTS FOR THE PREPARATION OF HYDROCARBON RESINS

[75] Inventors: Dennis G. Morrell; Laura M. Babcock, both of Hockessin, Del.

[73] Assignee: Hercules Incorporated, Wilmington, Del.

[21] Appl. No.: 09/003,888

[22] Filed: Jan. 7, 1998

Related U.S. Application Data

[60] Provisional application No. 60/035,217, Jan. 8, 1997, provisional application No. 60/034,579, Jan. 9, 1997, and provisional application No. 60/035,797, Jan. 10, 1997.

[51] Int. Cl.$^7$ ............................... C08F 4/22; C08F 12/12
[52] U.S. Cl. .................... 526/130; 526/172; 526/283; 526/290; 526/308; 526/335; 526/336; 526/346; 526/347.1; 526/348.4; 526/348.6; 526/348.7
[58] Field of Search ................................ 526/172, 290, 526/346, 347.1, 130, 283, 308, 335, 336, 348.4, 348.6, 348.7

[56] References Cited

U.S. PATENT DOCUMENTS

| | | |
|---|---|---|
| Re. 31,443 | 11/1983 | McDaniel et al. . |
| 2,301,966 | 11/1942 | Michel et al. . |
| 2,507,864 | 5/1950 | Moore et al. . |
| 2,559,576 | 7/1951 | Johnstone . |
| 2,626,290 | 1/1953 | Fell et al. . |
| 2,626,291 | 1/1953 | Betts . |
| 2,632,777 | 3/1953 | Pines . |
| 2,642,402 | 6/1953 | Corner et al. . |
| 2,694,686 | 11/1954 | Reeves et al. . |
| 2,721,889 | 10/1955 | Murphree et al. . |
| 2,728,804 | 12/1955 | Mueller . |
| 2,732,398 | 1/1956 | Brice et al. . |
| 2,734,046 | 2/1956 | Nelson et al. . |
| 2,739,143 | 3/1956 | Goering et al. . |
| 2,744,084 | 5/1956 | Arey . |
| 2,745,890 | 5/1956 | Cahn . |
| 2,748,090 | 5/1956 | Watkins . |
| 2,751,331 | 6/1956 | Alpert et al. . |
| 2,753,325 | 7/1956 | Banes et al. . |
| 2,753,382 | 7/1956 | Hamner . |
| 2,758,143 | 8/1956 | Arundale et al. . |
| 2,766,311 | 10/1956 | Mayer et al. . |
| 2,766,312 | 10/1956 | Serniuk . |
| 2,767,234 | 10/1956 | Dauber et al. . |
| 2,772,317 | 11/1956 | Smith et al. . |
| 2,773,051 | 12/1956 | Leary . |
| 2,775,577 | 12/1956 | Schneider et al. . |
| 2,778,804 | 1/1957 | Corner et al. . |
| 2,779,753 | 1/1957 | Garabrant et al. . |
| 2,786,878 | 3/1957 | Arundale et al. . |
| 2,816,944 | 12/1957 | Muessig et al. . |
| 2,831,037 | 4/1958 | Schmerling . |
| 2,849,428 | 8/1958 | Small et al. . |
| 2,852,580 | 9/1958 | Geiser . |
| 2,878,240 | 3/1959 | Schmerling . |
| 2,906,793 | 9/1959 | Rowe et al. . |
| 2,914,517 | 11/1959 | Schmerling . |
| 2,938,018 | 5/1960 | Schmerling . |

(List continued on next page.)

FOREIGN PATENT DOCUMENTS

| | | |
|---|---|---|
| 0090569 | 10/1983 | European Pat. Off. . |
| 0101205 | 2/1984 | European Pat. Off. . |
| 0202965 | 11/1986 | European Pat. Off. . |
| 0273627 | 7/1988 | European Pat. Off. . |
| 0352856A1 | 1/1990 | European Pat. Off. . |
| 0352856B1 | 1/1990 | European Pat. Off. . |
| 0367385 | 5/1990 | European Pat. Off. . |
| 0367386 | 5/1990 | European Pat. Off. . |
| 0391697 | 10/1990 | European Pat. Off. . |
| 0575866 | 12/1993 | European Pat. Off. . |

(List continued on next page.)

OTHER PUBLICATIONS

Patent Abstracts of Japan, vol. 6, No. 250 (C–139) Dec. 9, 1982.

Patent Abstracts of Japan, vol. 96, No. 5, May 31, 1996.

Patent Abstracts of Japan, vol. 6, No. 191 (C–127), Sep. 30, 1982.

An International Search Report and Annex of PCT/US98/00009, dated May 22, 1998.

A Partial International Search Report and Annex of PCT/US 98/00012.

An International Search Report and Annex of PCT/US98/00010, dated May 14, 1998.

An International Search Report and Annex of PCT/US98/00011, dated May 22, 1998.

Bittles et al., "Clay–Catalyzed Reactions of Olefins. I. Polymerization of Styrene", *Journal of Polymer Science: Part A*, vol. 2, pp. 1221–1231 (1964).

Bittles et al., "Clay–Catalyzed Reactions of Olefins. II. Catalyst Acidity and Mechanism", *Journal of Polymer Science: Part A*, vol. 2, pp. 1847–1862 (1964).

Salt, "The Use of Activated Clays as Catalysts in Polymerization Processes, with Particular Reference to Polymers of Alpha Methyl Styrene", *Clay Minerals Bulletin*, vol. 2, pp. 55–58 (1948).

(List continued on next page.)

*Primary Examiner*—Fred Teskin
*Attorney, Agent, or Firm*—Greenblum & Bernstein, P.L.C.

[57] ABSTRACT

Metal oxide solid acids are used as catalysts for the polymerization of a feed stream containing at least one of pure monomer (e.g., styrene based monomers), C5 monomers, and C9 monomers to produce hydrocarbon resins. Freely-associated water may be removed from the solid acid catalyst prior to use. Resins with softening points (Ring and Ball) in the range of about 5° C. to 170° C. can be prepared. These catalysts offer advantages over the traditional Friedel-Crafts polymerization catalysts since the acid sites are an integral part of the solid. The solid acid catalysts are relatively nonhazardous, reusable catalysts which eliminate or at least reduce contamination of the resulting resin products with acid residues or by-products.

22 Claims, No Drawings

U.S. PATENT DOCUMENTS

| | | |
|---|---|---|
| 2,945,845 | 7/1960 | Schmerling . |
| 2,976,338 | 3/1961 | Thomas . |
| 2,987,511 | 6/1961 | Arrigo . |
| 3,000,868 | 9/1961 | Powers . |
| 3,006,905 | 10/1961 | Geiser . |
| 3,006,906 | 10/1961 | Geiser . |
| 3,017,400 | 1/1962 | Bloch . |
| 3,024,226 | 3/1962 | Nolan et al. . |
| 3,037,970 | 6/1962 | Geiser . |
| 3,109,041 | 10/1963 | Child et al. . |
| 3,112,350 | 11/1963 | Bielawski et al. . |
| 3,113,165 | 12/1963 | Bloch . |
| 3,128,318 | 4/1964 | Meisinger et al. . |
| 3,133,127 | 5/1964 | Heisler et al. . |
| 3,154,595 | 10/1964 | Donaldson et al. . |
| 3,166,545 | 1/1965 | Pezdirtz . |
| 3,179,649 | 4/1965 | Feay et al. . |
| 3,190,936 | 6/1965 | Child et al. . |
| 3,190,938 | 6/1965 | Kirshenbaum et al. . |
| 3,244,767 | 4/1966 | Nixon . |
| 3,248,341 | 4/1966 | Louvar . |
| 3,347,678 | 10/1967 | Cripps . |
| 3,364,191 | 1/1968 | Donaldson et al. . |
| 3,374,285 | 3/1968 | Henke et al. . |
| 3,383,378 | 5/1968 | Bloch et al. . |
| 3,418,304 | 12/1968 | Langer et al. . |
| 3,420,809 | 1/1969 | Tornqvist . |
| 3,426,089 | 2/1969 | Kennedy . |
| 3,427,275 | 2/1969 | Davis et al. . |
| 3,457,189 | 7/1969 | De Rosset . |
| 3,463,744 | 8/1969 | Mitsche . |
| 3,464,929 | 9/1969 | Mitche . |
| 3,497,568 | 2/1970 | Stepanek et al. . |
| 3,499,877 | 3/1970 | Arnold . |
| 3,515,769 | 6/1970 | Fishel . |
| 3,555,107 | 1/1971 | Estes . |
| 3,577,400 | 5/1971 | Judy . |
| 3,586,616 | 6/1971 | Kropp . |
| 3,597,403 | 8/1971 | Ofstead . |
| 3,597,406 | 8/1971 | Calderon . |
| 3,607,959 | 9/1971 | Estes et al. . |
| 3,609,098 | 9/1971 | Brown . |
| 3,624,060 | 11/1971 | Judy . |
| 3,630,981 | 12/1971 | Finfinger et al. . |
| 3,631,212 | 12/1971 | Schmerling . |
| 3,640,981 | 2/1972 | Davis . |
| 3,644,220 | 2/1972 | Kearby . |
| 3,652,487 | 3/1972 | Ward . |
| 3,652,706 | 3/1972 | Saines et al. . |
| 3,652,707 | 3/1972 | Saines et al. . |
| 3,657,205 | 4/1972 | Throckmorton . |
| 3,657,208 | 4/1972 | Judy . |
| 3,661,870 | 5/1972 | Bullard . |
| 3,669,947 | 6/1972 | Kahn et al. . |
| 3,689,434 | 9/1972 | Suggitt et al. . |
| 3,689,471 | 9/1972 | Judy . |
| 3,692,694 | 9/1972 | Kravitz et al. . |
| 3,692,695 | 9/1972 | Suggitt et al. . |
| 3,692,696 | 9/1972 | Kravitz et al. . |
| 3,692,697 | 9/1972 | Kravitz et al. . |
| 3,692,872 | 9/1972 | Calderon et al. . |
| 3,711,425 | 1/1973 | Suggitt et al. . |
| 3,717,586 | 2/1973 | Suggitt et al. . |
| 3,734,866 | 5/1973 | Aylies et al. . |
| 3,746,696 | 7/1973 | Judy . |
| 3,753,961 | 8/1973 | St. Cyr . |
| 3,753,962 | 8/1973 | Restaino . |
| 3,772,255 | 11/1973 | Bell . |
| 3,772,401 | 11/1973 | Stepanek . |
| 3,799,913 | 3/1974 | Wheeler et al. . |
| 3,801,559 | 4/1974 | Ofstead et al. . |
| 3,842,019 | 10/1974 | Kropp . |
| 3,867,361 | 2/1975 | Calderon et al. . |
| 3,888,789 | 6/1975 | Dombro et al. . |
| 3,926,882 | 12/1975 | Henk et al. . |
| 3,929,737 | 12/1975 | Tazuma et al. . |
| 3,932,332 | 1/1976 | Douglas et al. . |
| 3,932,553 | 1/1976 | Robert . |
| 3,935,179 | 1/1976 | Ofstead . |
| 3,943,116 | 3/1976 | Bell . |
| 3,945,986 | 3/1976 | Ofstead . |
| 3,956,180 | 5/1976 | Cavitt . |
| 3,956,250 | 5/1976 | Campbell et al. . |
| 3,975,336 | 8/1976 | Lal et al. . |
| 3,987,109 | 10/1976 | Brennan et al. . |
| 3,992,322 | 11/1976 | Dombro et al. . |
| 3,997,471 | 12/1976 | Ofstead . |
| 4,009,228 | 2/1977 | Tazuma et al. . |
| 4,010,113 | 3/1977 | Ofstead . |
| 4,013,736 | 3/1977 | Woo . |
| 4,020,254 | 4/1977 | Ofstead . |
| 4,028,272 | 6/1977 | Throckmorton . |
| 4,038,471 | 7/1977 | Castner . |
| 4,062,801 | 12/1977 | Burton et al. . |
| 4,064,335 | 12/1977 | Lal et al. . |
| 4,068,062 | 1/1978 | Lepert et al. . |
| 4,075,404 | 2/1978 | Douglas et al. . |
| 4,105,843 | 8/1978 | Iwase et al. . |
| 4,108,944 | 8/1978 | Tazuma et al. . |
| 4,127,710 | 11/1978 | Hsieh . |
| 4,130,701 | 12/1978 | Lepert . |
| 4,133,801 | 1/1979 | Morimatsu et al. . |
| 4,137,390 | 1/1979 | Ofstead . |
| 4,153,771 | 5/1979 | Bullard et al. . |
| 4,168,357 | 9/1979 | Throckmorton et al. . |
| 4,171,414 | 10/1979 | Wagensommer et al. . |
| 4,172,932 | 10/1979 | Ofstead et al. . |
| 4,205,160 | 5/1980 | Gloth et al. . |
| 4,230,840 | 10/1980 | Katayama et al. . |
| 4,233,139 | 11/1980 | Murrell et al. . |
| 4,239,874 | 12/1980 | Ofstead et al. . |
| 4,245,075 | 1/1981 | Lepert . |
| 4,248,735 | 2/1981 | McDaniel et al. . |
| 4,294,724 | 10/1981 | McDaniel . |
| 4,296,001 | 10/1981 | Hawley . |
| 4,299,731 | 11/1981 | McDaniel et al. . |
| 4,301,034 | 11/1981 | McDaniel . |
| 4,328,090 | 5/1982 | Stuckey, Jr. et al. . |
| 4,339,559 | 7/1982 | McDaniel . |
| 4,345,055 | 8/1982 | Hawley . |
| 4,347,158 | 8/1982 | Kaus et al. . |
| 4,359,406 | 11/1982 | Fung . |
| 4,363,746 | 12/1982 | Capshew . |
| 4,364,840 | 12/1982 | McDaniel et al. . |
| 4,364,841 | 12/1982 | McDaniel et al. . |
| 4,364,854 | 12/1982 | McDaniel et al. . |
| 4,367,352 | 1/1983 | Watt, Jr. et al. . |
| 4,368,303 | 1/1983 | McDaniel . |
| 4,378,306 | 3/1983 | Welch et al. . |
| 4,382,022 | 5/1983 | McDaniel . |
| 4,384,086 | 5/1983 | McDaniel et al. . |
| 4,391,737 | 7/1983 | Bell . |
| 4,395,578 | 7/1983 | Larkin . |
| 4,397,765 | 8/1983 | McDaniel . |
| 4,403,088 | 9/1983 | Smith et al. . |
| 4,415,715 | 11/1983 | Bell . |
| 4,419,268 | 12/1983 | McDaniel . |
| 4,422,957 | 12/1983 | Kaus et al. . |
| 4,424,139 | 1/1984 | McDaniel et al. . |
| 4,424,320 | 1/1984 | McDaniel . |
| 4,425,226 | 1/1984 | Reusser et al. . |
| 4,425,257 | 1/1984 | Miro et al. . |

| | | |
|---|---|---|
| 4,434,243 | 2/1984 | Martin . |
| 4,434,280 | 2/1984 | McDaniel et al. . |
| 4,436,948 | 3/1984 | Bobsein . |
| 4,439,543 | 3/1984 | McDaniel et al. . |
| 4,442,274 | 4/1984 | McDaniel et al. . |
| 4,442,275 | 4/1984 | Martin . |
| 4,444,904 | 4/1984 | Ryu . |
| 4,444,962 | 4/1984 | McDaniel et al. . |
| 4,444,966 | 4/1984 | McDaniel . |
| 4,444,968 | 4/1984 | McDaniel et al. . |
| 4,454,367 | 6/1984 | Sakurada et al. . |
| 4,513,166 | 4/1985 | Sakurada et al. . |
| 4,520,121 | 5/1985 | Inkrott et al. . |
| 4,520,222 | 5/1985 | Reusser et al. . |
| 4,536,358 | 8/1985 | Welsh et al. . |
| 4,547,474 | 10/1985 | Olah . |
| 4,547,479 | 10/1985 | Johnson et al. . |
| 4,555,496 | 11/1985 | Agapiou et al. . |
| 4,558,170 | 12/1985 | Chen et al. . |
| 4,565,795 | 1/1986 | Short et al. . |
| 4,567,153 | 1/1986 | Graves . |
| 4,575,538 | 3/1986 | Hsieh et al. . |
| 4,588,703 | 5/1986 | Cowan et al. . |
| 4,596,862 | 6/1986 | McDaniel et al. . |
| 4,604,438 | 8/1986 | Beuhler et al. . |
| 4,618,595 | 10/1986 | Dietz . |
| 4,618,661 | 10/1986 | Kaus et al. . |
| 4,619,980 | 10/1986 | McDaniel et al. . |
| 4,626,519 | 12/1986 | Miro et al. . |
| 4,680,351 | 7/1987 | Miro et al. . |
| 4,681,866 | 7/1987 | McDaniel et al. . |
| 4,684,707 | 8/1987 | Evans . |
| 4,686,092 | 8/1987 | Lok et al. . |
| 4,699,962 | 10/1987 | Hsieh et al. . |
| 4,711,866 | 12/1987 | Kuntz . |
| 4,719,190 | 1/1988 | Drago et al. . |
| 4,719,271 | 1/1988 | Dietz . |
| 4,721,559 | 1/1988 | Olah . |
| 4,732,936 | 3/1988 | Holohan et al. . |
| 4,744,970 | 5/1988 | Lok et al. . |
| 4,757,044 | 7/1988 | Cooper et al. . |
| 4,780,513 | 10/1988 | Powers et al. . |
| 4,788,171 | 11/1988 | Klendworth . |
| 4,791,086 | 12/1988 | Yeh et al. . |
| 4,793,833 | 12/1988 | Lok et al. . |
| 4,801,364 | 1/1989 | Wilson et al. . |
| 4,814,308 | 3/1989 | Konrad et al. . |
| 4,824,554 | 4/1989 | Lok et al. . |
| 4,824,921 | 4/1989 | Luvinh . |
| 4,843,133 | 6/1989 | Short et al. . |
| 4,845,066 | 7/1989 | Fahey et al. . |
| 4,846,956 | 7/1989 | Lok et al. . |
| 4,849,572 | 7/1989 | Chen et al. . |
| 4,868,343 | 9/1989 | King et al. . |
| 4,879,425 | 11/1989 | Kukes et al. . |
| 4,894,213 | 1/1990 | Flanigen et al. . |
| 4,900,704 | 2/1990 | McDaniel et al. . |
| 4,912,279 | 3/1990 | Wilcher et al. . |
| 4,929,800 | 5/1990 | Drago et al. . |
| 4,935,576 | 6/1990 | Chen . |
| 4,948,768 | 8/1990 | Kukes et al. . |
| 4,952,544 | 8/1990 | McCauley . |
| 4,952,739 | 8/1990 | Chen . |
| 4,956,420 | 9/1990 | White et al. . |
| 4,957,889 | 9/1990 | McCauley . |
| 4,982,045 | 1/1991 | Chen et al. . |
| 4,987,200 | 1/1991 | Datta et al. . |
| 5,008,468 | 4/1991 | King et al. . |
| 5,017,662 | 5/1991 | White . |
| 5,064,802 | 11/1991 | Stevens et al. . |
| 5,073,351 | 12/1991 | Witt . |
| 5,075,394 | 12/1991 | McDaniel et al. . |
| 5,081,086 | 1/1992 | Wilcher et al. . |
| 5,110,778 | 5/1992 | Olah . |
| 5,113,034 | 5/1992 | Soled et al. . |
| 5,139,761 | 8/1992 | Nair et al. . |
| 5,171,791 | 12/1992 | Marchand et al. . |
| 5,177,288 | 1/1993 | Chen . |
| 5,191,132 | 3/1993 | Patsidis et al. . |
| 5,191,140 | 3/1993 | Akatsu et al. . |
| 5,198,512 | 3/1993 | Jackson et al. . |
| 5,198,563 | 3/1993 | Reagen et al. . |
| 5,200,379 | 4/1993 | McDaniel et al. . |
| 5,206,314 | 4/1993 | Mitchell et al. . |
| 5,225,493 | 7/1993 | Marchard et al. . |
| 5,272,124 | 12/1993 | Wu . |
| 5,283,301 | 2/1994 | McDaniel et al. . |
| 5,284,811 | 2/1994 | Witt et al. . |
| 5,286,823 | 2/1994 | Rath . |
| 5,288,677 | 2/1994 | Chung et al. . |
| 5,321,106 | 6/1994 | Lapointe . |
| 5,322,910 | 6/1994 | Wu . |
| 5,324,881 | 6/1994 | Kresge et al. . |
| 5,326,921 | 7/1994 | Chen . |
| 5,326,923 | 7/1994 | Cooper et al. . |
| 5,328,881 | 7/1994 | Jackson et al. . |
| 5,330,949 | 7/1994 | Funabahsi et al. . |
| 5,331,104 | 7/1994 | Reagen et al. . |
| 5,332,708 | 7/1994 | Knudson et al. . |
| 5,338,812 | 8/1994 | Knudson et al. . |
| 5,347,026 | 9/1994 | Patsidis et al. . |
| 5,350,723 | 9/1994 | Neithamer et al. . |
| 5,350,726 | 9/1994 | Shaffer . |
| 5,350,819 | 9/1994 | Shaffer . |
| 5,354,721 | 10/1994 | Geerts . |
| 5,362,825 | 11/1994 | Hawley et al. . |
| 5,365,010 | 11/1994 | Rao et al. . |
| 5,366,945 | 11/1994 | Kresge et al. . |
| 5,371,154 | 12/1994 | Brandvold et al. . |
| 5,382,420 | 1/1995 | Vaughan . |
| 5,384,299 | 1/1995 | Turner et al. . |
| 5,393,911 | 2/1995 | Patsidis et al. . |
| 5,399,635 | 3/1995 | Neithamer et al. . |
| 5,399,636 | 3/1995 | Alt et al. . |
| 5,401,817 | 3/1995 | Palackal et al. . |
| 5,403,803 | 4/1995 | Shaffer et al. . |
| 5,409,873 | 4/1995 | Chung et al. . |
| 5,412,024 | 5/1995 | Okada et al. . |
| 5,414,177 | 5/1995 | Chung et al. . |
| 5,414,180 | 5/1995 | Geerts et al. . |
| 5,414,187 | 5/1995 | King et al. . |
| 5,418,303 | 5/1995 | Shaffer . |
| 5,426,080 | 6/1995 | Kundsen et al. . |
| 5,436,305 | 7/1995 | Alt et al. . |
| 5,444,132 | 8/1995 | Witt et al. . |
| 5,446,102 | 8/1995 | Oziomek et al. . |
| 5,453,410 | 9/1995 | Kolthammer et al. . |
| 5,459,218 | 10/1995 | Palacal et al. . |
| 5,461,127 | 10/1995 | Naganum et al. . |
| 5,466,766 | 11/1995 | Patsidis et al. . |
| 5,475,162 | 12/1995 | Brandvold et al. . |
| 5,491,214 | 2/1996 | Daughenbaugh et al. . |
| 5,561,095 | 10/1996 | Chen et al. . |
| 5,633,419 | 5/1997 | Spencer et al. . |
| 5,648,580 | 7/1997 | Chen et al. . |
| 5,710,225 | 1/1998 | Johnson et al. ........................ 526/172 |

FOREIGN PATENT DOCUMENTS

| | | |
|---|---|---|
| 1963684 | 8/1970 | Germany . |
| 5836982 | 3/1979 | Germany . |
| 859391 | 9/1981 | Russian Federation . |
| 91/14719 | 10/1991 | WIPO . |
| 92/04115 | 3/1992 | WIPO . |
| 93/02110 | 2/1993 | WIPO . |

| | | |
|---|---|---|
| 93/19103 | 9/1993 | WIPO . |
| 94/13714 | 6/1994 | WIPO . |
| 94/28036 | 12/1994 | WIPO . |
| 94/28037 | 12/1994 | WIPO . |
| 96/05236 | 2/1996 | WIPO . |

OTHER PUBLICATIONS

Peng et al., "Electrophilic Polymerization of 1,3–Pentadiene Initiated by Aluminum Triflate", *Eur. Polym. J.*, vol. 30, No. 1, pp. 69–77 (1994).

Gandini et al., "The Heterogeneous Cationic Polymerization of Aromatic Monomers by Aluminum Triflate", *Polymer Preprints*, American Chemical Society, pp. 359–360 (1996).

Okuhara et al., "Catalytic Chemistry of Heteropoly Compounds", *Advances in Catalysis*, vol. 41, pp. 113–252 (1996).

Misono et al., "Solid Superacid Catalysts", *Chemtech*, pp. 23–29 (Nov. 1993).

Deno et al., "Acid Catalysis in $O_2$ Oxidations and the Possible Role of the Hydroperoxy Cation, $HO_2 \cdot$", *Journal of the American Chemical Society*, 91:19, pp. 5237–38 (Sep. 10, 1969).

Stevens, "Insite™ Catalysts Structure/Activity Relationships for Olefin Polymerization", *Stud. Surf. Sci. Catal.*, vol. 89, pp. 277–84 (1994).

Habimana et al., "Synthesis of Polymers Containing Pseudohalide Groups by Cationic Polymerization. 5. Study of Various Aspects of the 2–Methylpropene Polymerization Coinitiated by Hydrazoic Acid" *Macromolecules*, vol. 26, No. 9, pp. 2297–2302 (1993).

Cheradame et al., "Synthesis of Polymers Containing Pseudohalide Groups by Cationic Polymerization, $7^{a)}$, Thiocyanato– and Isothiocyanato–functionalized Poly(2–methylpropene)", *Makromol. Chem., Rapid Commun.*, 13, pp. 433–39 (1992).

Cheradame et al., "Synthesis of Polymers Containing Pseudohalide Groups by Cationic Polymerization, $4^{a)}$, Cocatalysis as a Direct Route to End–capped Poly(2–methylpropene) with Pseudohalide Groups", *Makromol. Chem.*, 193, pp. 2647–58 (1992).

Cheradame et al., "Synthesis of Polymers Containing Pseudohalide Groups by Cationic Polymerization, $3^{a)}$, Preliminary Study of the Polymerization and Copolymerization of Alkenyl Monomers Containing Azide Groups", *Makromol. Chem.*, 192, pp. 2777–89 (1991).

Hlatky et al., "Ionic, Base–Free Zirconocene Catalysts for Ethylene Polymerization", *J. Am. Chem. Soc.*, 111, pp. 2728–29 (1989), accompanied by 48 pages of Supplementary Material.

Hlatky et al., "Metallacarboranes as Labile Anions for Ionic Zirconocene Olefin Polymerization Catalysts", *Organometallics*, 11, pp. 1413–16 (1992), accompanied by 7 pages of Supplementary Material.

Cheradame et al., "Heterogeneous Cationic Polymerization Initiators I: Polymerization of 2–methylpropene in a Non Polar Medium", *C.R. Acad. Sci. Paris*, t. 318, série II, pp. 329–34 (1994), including an English language abstract.

Schmid et al., "Unbridged Cyclopentadienyl–Fluorenyl Complexes of Zirconium as Catalysts for Homogeneous Olefin Polymerization", *Journal of Organometallic Chemistry*, 501, pp. 101–06 (1995).

Alt et al., "Verbrückte Bis(fluorenyl)komplexe des Zirconiums und Hafniums als hochreaktive Katalysatoren bei der homogenen Olefinpolymerisation. Die Molekülstrukturen von $(C_{13}H_9-C_2H_4-C_{13}H_9)$ und $(\eta^5{:}\eta^5-C_{13}H_8-C_2H_4-C_{13}H_8)ZrCl_2$", *Journal of Organometallic Chemistry*, 472, pp. 113–118 (1994).

Smith et al., "Bimetallic Halides. Crystal Structure of and Ethylene Polymerization by $VCl_2 \cdot ZnCl_2 \cdot 4THF$", *Inorganic Chemistry*, vol. 24, No. 19, pp. 2997–3002 (1985), accompanied by 19 pages of Supplementary Material.

Martin, "Titanium and Rare Earth Chloride Catalysts for Ethylene Polymerization", *Journal of Polymer Science: Polymer Chemistry Edition*, vol. 22, pp. 3843–50 (1984).

Freeman et al., "Ethylene Polymerization Over Organochromium Catalysts: A Comparison Between Closed and Open Pentadienyl Ligands", *Journal of Polymer Chemistry: Part A: Polymer Chemistry*, vol. 25, pp. 2063–75 (1987).

Clark et al., "Heats of Polymerization of 1–Butene over Silica–Alumina", *Journal of Catalysis*, 21, pp. 179–85 (1971).

McDaniel, "Controlling Polymer Properties with the Phillips Chromium Catalysts", *Ind. Eng. Chem. Res.*, 27, pp. 1559–64 (1988).

Patsidis et al., "The Preparation and Characterization of 9–Substituted Bis(fluorenyl) Zirconium Dichloride Complexes", *Journal of Organometallic Chemistry*, 501, pp. 31–35 (1995).

Alt et al., "Formation and Reactivity of the Ethylene Complex $Cp_2TiC_2H_4$. The Crystal Structure of $(Cp_2TiEt)_2O$", *Journal of Organometallic Chemistry*, 349, pp. C7–C10 (1988).

Smith et al., "Synthesis of Copolymers of m–Diisopropylbenzene and m–Dimethoxybenzene", *Polymer Sci Technol. (Plenum)*, 25, pp. 415–29 (1984).

Kennedy et al., "New Telechelic Polymers and Sequential Copolymers by Polyfunctional Initiator–Transfer Agents (Inifers I. Synthesis and Characterization of $\alpha,\omega$–Di–(t–chloro)polyisobutylene", *Polym. Prepr.*, 20(2), pp. 316–19 (1979).

Izumi, "Silica–Included Heteropoly Compounds as Insoluble, Readily Separable Solid Acid Catalysts", Slides Presented at the 1995 International Chemical Congress of Pacific Basin Societies in Honolulu, Hawaii (Dec. 17–22, 1995).

Cai et al., "Study on the Oligomerization of Isobutene Using Heteropoly Acids and Their Salts as Catalysts", *Cuihua Xuebaco*, pp. 370, 371, and 375 (1985).

Corma, "Inorganic Solid Acids and Their Use in Acid–Catalyzed Hydrocarbon Reactions", *Chem. Rev.*, 95, pp. 559–614 (1995).

Okuhara et al., "Acid Strength of Heteropolyacids and Its Correlation with Catalytic Activity", *Bull. Chem. Soc. Jpn.*, 67, pp. 1186–88 (1994).

Vaughn et al., "High–Pressure Oligomerization of Propene over Heteropoly Acids", *Journal of Catalysis*, 147, pp. 441–54 (1994).

Okuhara et al., "Alkylation of Isobutene with Butenes Catalyzed by a Cesium Hydrogen Salt of 12–Tungstophosphoric Acid", *Chemistry Letters*, pp. 1451–54 (1994).

Kamada et al., "Dispersion and Fixation of 12–Tungstophosphate Anion on a Silica Surface Modified with Silane Agents Having an Amine Group and Their Catalytic Properties", *Bull. Chem. Soc. Jpn.*, 66, pp. 3565–70 (1993).

Na et al., "Skeletal Isomerization of n–Butane Catalyzed by an Acidic Cesium Salt of 12–Tungstophosphoric Acid", *Chemistry Letters*, pp. 1141–44 (1993).

Izumi et al., "Acidic Cesium Salts of Keggin–type Heteropolytungstic Acids as Insoluble Solid Acid Catalysts for Esterification and Hydrolysis Reactions", *Chemistry Letters*, pp. 825–28 (1993).

Hu et al., "Catalysis by Heteropoly Compounds XXII. Reactions of Esters and Esterification Catalyzed by Heteropolyacids in a Homogeneous Liquid Phase—Effects of the Central Atom of Heteropolyanions Having Tungsten as the Addenda Atom", *Journal of Catalysis*, 143, pp. 437–48 (1993).

Lee et al., "Catalysis by Heteropoly Compounds. 20. An NMR Study of Ethanol Dehydration in the Pseudoliquid Phase of 12–Tungstophosphoric Acid", *J. Am. Chem. Soc.*, 114, pp. 2836–42 (1992).

Izumi et al., "Acidic Alkali Metal Salts and Ammonium Salts of Keggin–type Heteropolyacids as Efficient Solid Acid Catalysts for Liquid–phase Friedel–Crafts Reactions", *Chemistry Letters*, pp. 1987–90 (1992).

Kozhevnikov et al., "De–t–Butylation of Phenols Catalyzed by Bulk and Supported Heteropoly Acid", *Journal of Molecular Catalysis*, 75, pp. 179–86 (1992).

Nishimura et al., "High Catalytic Activities of Pseudoliquid Phase of Dodecatungstophosphoric Acid for Reactions of Polar Molecules", *Chemistry Letters*, pp. 1695–98 (1991).

Lee et al., "NMR Evidence for Ethyl Cation and Protonated Ethanol in the Pseudoliquid Phase of $H_3PW_{12}O_{40}$", *Chemistry Letters*, pp. 1175–78 (1988).

Baba et al., "Heteropolyacids and their Salts Supported on Acidic Ion–Exchange Resin as Highly Active Solid–Acid Catalysts", *Applied Catalysis*, 22, pp. 321–24 (1986).

Hibi et al., "Catalysis by Heteropoly Compounds X. Synthesis of Lower Olefins by Conversion of Dimethyl Ether Over 12–Tungstophosphates", *Applied Catalysis*, 24, pp. 69–83 (1986).

Tatematsu et al., "Preparation Process and Catalytic Activity of $Cs_xH_{3-x}PW_{12}O_{40}$", *Chemistry Letters*, pp. 865–68 (1984).

Hayashi et al., "Methanol Conversion over Metal Salts of 12–Tungstophosphoric Acid", *Journal of Catalysis*, 81, pp. 61–66 (1983).

Izumi et al., "Catalysis by Heterogeneous Supported Heteropoly Acid", *Journal of Catalysis*, 84, pp. 402–09 (1983).

Izumi et al., "Efficient Homogeneous Acid Catalysis of Heteropoly Acid and its Characterization Through Ether Cleavage Reactions", *Journal of Molecular Catalysis*, 18, pp. 299–314 (1983).

Okuhara et al., "Catalysis by Heteropoly Compounds. VI. The Role of the Bulk Acid Sites in Catalytic Reactions over $Na_xH_{3-x}PW_{12}O_{40}$", *Journal of Catalysis*, 83, pp. 121–30 (1983).

Baba et al., "The Conversion of Methanol into Hydrocarbons over Metal Salts of Heteropolyacids", *Bull. Chem. Soc. Jpn.*, 55, pp. 2657–58 (1982).

Sebulsky et al., "Alkylation of Benzene with Dodecene–1 Catalyzed by Supported Silicotungstic Acid", *Ind. Eng. Chem. Process Des. Develop.*, vol. 10, No. 2, pp. 272–79 (1971).

Pillai et al., "Oligomerization of Vinylic Compounds on Montmorillonite Clay Catalysts", *React. Kinet. Catal. Lett.*, vol. 55, No. 2, pp. 251–57 (1995).

Okuhara et al., "Insoluble Heteropoly Compounds as Highly Active Catalysts for Liquid–phase Reactions", *J. Mol. Cat.*, 75, pp. 247–56 (1992).

Mizuno et al., "Heteropolyanions in Catalysis", *Journal of Molecular Catalysis*, 86, pp. 319–42 (1994).

Izumi et al., "Heteropoly Acid as Multifunctional Catalyst", *Zeolite, Clay, and Heteropoly Acid in Organic Reactions*, Chap. 3, pp. 99–161 (1992).

Ono, "Heteropoly Acid Catalysis—a Unique Blend of Acid––Base and Redox Properties", *Properties in Catalysis*, pp. 431–64 (1992).

Misono, "Heterogeneous Catalysis by Heteropoly Compounds of Molybdenum and Tungsten", *Catal. Rev.–Sci. Eng.*, 29(2&3), pp. 269–321 (1987).

Fu et al., "Perfluorooctanesulfonic Acid Catalyzed Friedel–Crafts Alkylation with Alkyl Halides", *Synthetic Communications*, 21(10&11), pp. 1273–79 (1991).

Waller et al., "Catalysis with Nafion", *Chemtech*, 17, pp. 438–41 (Jul. 1987).

Harmer et al., "Unique Silane Modified Perfluorosulfonic Acids as Versatile Reagents for New Solid Acid Catalysts", *Chem. Commun.*, pp. 1803–04 (1997).

Harmer et al., "High Surface Area Nafion Resin/Silica Nanocomposites: A New Class of Solid Acid Catalyst", *J. Am. Chem. Soc.*, vol. 118, No. 33, pp. 7708–15 (1996).

Kawada et al., "Lanthanide Trifluoromethanesulfonates as Reusable Catalysts: Catalytic Friedel–Crafts Acylation", *J. Chem. Soc., Chem. Commun.*, pp. 1157–58 (1993).

Kobayashi et al., "The Aldol Reaction of Silyl Enol Ethers with Aldehydes in Aqueous Media", *Tetrahedron Letters*, vol. 33, No. 12, pp. 1625–28 (1992).

Thomas et al., "Chemistry of Weakly Solvated Lanthanide–Metal Cations. Synthesis, Characterization, and Catalytic Chemistry of $[Eu(CH_3CN)_3(BF_4)_3]_x$", *J. Am. Chem. Soc.*, 108, 4096–4103 (1986).

Holohan et al., "Hydrocarbon Resins", reprinted from *Kirk–Othmer: Encyclopedia of Chemical Technology*, vol. 12, pp. 852–69 (1980).

Chemical Abstract No. 84:73847a (1976).

Olah et al., "Boron, Aluminum, and Gallium Tris(trifluoromethanesulfonate) (Triflate): Effective New Friedel–Crafts Catalysts", *J. Am. Chem. Soc.*, 110, pp. 2560–65 (1988).

Collomb et al., "Cationic Polymerisation and Electrophilic Reactions Promoted by Metal Salts of Strong Acids", *Cationic Polymerization and Related Processes*, pp. 49–67 (1984).

Collomb et al., "Cationic Polymerization Induced by Metal Salts—I", *European Polymer Journal*, vol. 16, pp. 1135–44 (1980).

Collomb et al., "Cationic Polymerisation Induced by Metal Salts of Strong Acids: Kinetics and Mechanisms", *Proc. IUPAC, I.U.P.A.C., Macromol. Symp., 28th*, p. 136 (1982).

Lowery, "Hydrocarbon Resins", *Kirk–Othmer: Encyclopedia of Chemical Technology*, vol. 13, pp. 717–43 (1995).

Cai et al., "Study on the Oligomerization of Isobutene Using Heteropoly Acids and Their Salts as Catalysts", *Cuihua Xuebao (Journal of Catalysis)*, pp. 370–75 (1985).

International Search Report.

Cai et al., "Study on the Oligomerization of Isobutene Using Heteropoly Acids and Their Salts as Catalyts", *Cuihua Xuebao(Journal of Catalysis)*, pp. 370–375 (1985).

International Search Report.

METAL OXIDE SOLID ACIDS AS CATALYSTS FOR THE PREPARATION OF HYDROCARBON RESINS

CROSS-REFERENCE TO RELATED APPLICATIONS

The present application claims the priority under 35 U.S.C. §119(e) of U.S. Provisional Application No. 60/035,217, filed Jan. 8, 1997; U.S. Provisional Application No. 60/034,579, filed Jan. 9, 1997; and U.S. Provisional Application No. 60/035,797, filed Jan. 10, 1997; the disclosures of which are herein expressly incorporated by reference in their entirety. The present application also expressly incorporates by reference the entire disclosures of U.S. application Ser. No. 09/003,596, pending entitled "Solid Acids as Catalysts for the Preparation of Hydrocarbon Resins"; U.S. application Ser. No. 09/003,879, pending entitled "Metal Halide Solid Acids and Supported Metal Halides as Catalysts for the Preparation of Hydrocarbon Resins"; and U.S. application Ser. No. 09/003,594, pending entitled "Fluorinated Solid Acids as Catalysts for the Preparation of Hydrocarbon Resins"; which are concurrently filed with the present application.

BACKGROUND OF THE INVENTION

1. Field of the Invention

This invention relates to metal oxide solid acids useful as catalysts for the polymerization of a feed stream containing at least one of pure monomer, C5 monomers, and C9 monomers to produce a hydrocarbon resin, to processes of preparing hydrocarbon resins using solid acid catalysts, and to hydrocarbon resins produced by such processes.

2. Discussion of Background

Hydrocarbon resins are low molecular weight, thermoplastic materials prepared via thermal or catalytic polymerization. The resins may be derived from several different sources of monomers. The monomer sources include cracked petroleum distillate from oil refining, turpentine fractions (e.g., terpenes from natural product distillation), paper mill by-product streams, coal tar, and a variety of pure olefinic monomers.

The resulting hydrocarbon resins can range from viscous liquids to hard, brittle solids with colors ranging from water white to pale yellow, amber, or dark brown depending on the monomers used and the specific reaction conditions. Typically, pure monomer resins tend to be water white, C9 monomer resins tend to be brown, and C5 monomer resins tend to be yellow.

Hydrocarbon resins are used extensively as modifiers in adhesives, rubber, hot-melt coatings, printing inks, paint, flooring, and other applications. The resins are usually used to modify other materials.

Pure monomer hydrocarbon resins can be prepared by cationic polymerization of styrene-based monomers such as styrene, alpha-methyl styrene, vinyl toluene, and other alkyl substituted styrenes using Friedel-Crafts polymerization catalysts such as Lewis acids (e.g., boron trifluoride ($BF_3$), complexes of boron trifluoride, aluminum trichloride ($AlCl_3$), alkyl aluminum chlorides).

Similarly, aliphatic C5 hydrocarbon resins can be prepared by cationic polymerization of a cracked petroleum feed containing C5 and C6 paraffins, olefins, and diolefins also referred to as "C5 monomers". These monomer streams are comprised of cationically polymerizable monomers such as 1,3-pentadiene which is the primary reactive component along with cyclopentene, pentene, 2-methyl-2-butene, 2-methyl-2-pentene, cyclopentadiene, and dicyclopentadiene. The polymerizations are catalyzed using Friedel-Crafts polymerization catalysts such as Lewis acids (e.g., boron trifluoride ($BF_3$), complexes of boron trifluoride, aluminum trichloride ($AlCl_3$), or alkyl aluminum chlorides). In addition to the reactive components, nonpolymerizable components in the feed include saturated hydrocarbons which can be codistilled with the unsaturated components such as pentane, cyclopentane, or 2-methylpentane. This monomer feed can be copolymerized with C4 or C5 olefins or dimers as chain transfer agents.

Also, aromatic C9 hydrocarbon resins can be prepared by cationic polymerization of aromatic C8, C9, and/or C1 unsaturated monomers derived from petroleum distillates resulting from naphtha cracking and are referred to as "C9 monomers". These monomer streams are comprised of cationically polymerizable monomers such as styrene, alpha-methyl styrene, beta-methyl styrene, vinyl toluene, indene, dicyclopentadiene, divinylbenzene, and other alkyl substituted derivatives of these components. The polymerizations are catalyzed using Friedel-Crafts polymerization catalysts such as Lewis acids (e.g., boron trifluoride ($BF_3$), complexes of boron trifluoride, aluminum trichloride ($AlCl_3$), alkyl aluminum chlorides). In addition to the reactive components, nonpolymerizable components include aromatic hydrocarbons such as xylene, ethyl benzene, cumene, ethyl toluene, indane, methylindane, naphthalene and other similar species. These nonpolymerizable components of the feed stream can be incorporated into the resins via alkylation reactions.

Although Lewis acids are effective catalysts for the cationic polymerization reactions to produce hydrocarbon resins, they have several disadvantages. Conventional Lewis acids are single use catalysts which require processing steps to quench the reactions and neutralize the acids.

Further, conventional Lewis acids also require removal of catalyst salt residues from the resulting resin products. Once the salt residues generated from the catalyst neutralization are removed, the disposal of these residues presents an additional cost. Therefore, it is of particular interest to reduce the amount of catalyst residues, particularly halogen-containing species generated in these reactions.

Another problem involved in using conventional Lewis acid catalysts, such as $AlCl_3$ and $BF_3$, is that they are hazardous materials. These conventional Lewis acid catalysts generate highly corrosive acid gases on exposure to moisture, (e.g., HF, HCl).

In addition to the traditional Lewis acids, work has been done with certain solid acid catalysts. BITTLES et al., "Clay-Catalyzed Reactions of Olefins. I. Polymerization of Styrene", *Journal of Polymer Science: Part A*, Vol. 2, pp. 1221–31 (1964) and BITTLES et al., "Clay-Catalyzed Reactions of Olefins. II. Catalyst Acidity and Measurement", *Journal of Polymer Science: Part A*, Vol. 2, pp. 1847–62 (1964), the disclosures of which are herein expressly incorporated by reference in their entirety, together disclose polymerization of styrene with acid clay catalysts to obtain polymers having molecular weights between 440 and 2000 as determined by freezing point depression of benzene solutions. These documents disclose that the catalyst was prepared for polymerization by heating under vacuum, and that if the catalyst adsorbed moisture, the activity of the catalyst could be restored by reheating under vacuum.

SALT, "The Use of Activated Clays as Catalysts in Polymerisation Processes, with Particular Reference to Polymers of Alpha Methyl Styrene", *Clay Minerals Bulletin*, Vol. 2, pp. 55–58 (1948), the disclosure of which is herein incorporated by reference in its entirety, discloses polymerization of styrene and/or alpha-methyl styrene by using a clay catalyst to obtain polymers that range from dimers to molecular weights of about 3000.

U.S. Pat. No. 5,561,095 to CHEN et al., the disclosure of which is herein incorporated by reference in its entirety, discloses a supported Lewis acid catalyst for polymerization of olefins, including C3–C23 alpha-olefins, to obtain polymers having number average molecular weights (Mn) ranging from about 300 to 300,000. Exemplary Lewis acid supports include silica, silica-alumina, zeolites, and clays. Example 1 of CHEN et al. discloses that a Lewis acid supported on silica is heated under vacuum.

U.S. Pat. No. 3,799,913 to WHEELER et al., the disclosure of which is herein incorporated by reference in its entirety, discloses Friedel-Crafts catalysts for polymerization of polymerizable constituents, including alpha-methyl styrene, indene, vinyl toluene and styrene, to obtain polymers having a number average molecular weight (Mn) ranging from about 350 to 1200. Zinc chloride is disclosed as one of the Friedel-Crafts catalysts.

U.S. Pat. No. 3,652,707 to SAINES, the disclosure of which is herein incorporated by reference in its entirety, discloses Friedel-Crafts metal halide catalysts for polymerization of olefin hydrocarbons, including pentene, styrene and methylstyrene, to obtain polymers having a molecular weight of from about 700 to about 2500. Zinc chloride is disclosed as one of the Friedel-Crafts metal halide catalysts.

PENG et al., "Electrophilic Polymerization of 1,3-Pentadiene Initiated by Aluminum Triflate", *Eur. Polym. J*, Vol. 30, No. 1, pp. 69–77 (1994), the disclosure of which is herein incorporated by reference in its entirety, discloses aluminum triflate for polymerization of piperylene to obtain polymers having varying number average molecular weights.

European Patent Application 0 352 856 A1, the disclosure of which is herein incorporated by reference in its entirety, discloses use of aluminum triflate, cerium triflate, e.g., for oligomerization of C3 to C6 olefins to obtain oligomers having 6 to 24 carbon atoms.

GANDINI et al., "The Heterogeneous Cationic Polymerization of Aromatic Monomers by Aluminum Triflate", *Polymer Preprints*, American Chemical Society, pp. 359–360 (1996), the disclosure of which is herein incorporated by reference in its entirety, discloses use of aluminum triflate for polymerization of C9 related monomers to obtain a polymer having a number average molecular weight (Mn) around 3000. This document also discloses that aluminum triflate could be useful for the direct "resinification"of mixtures of aromatic monomers and solvents arising from specific petroleum cuts.

Other documents, the disclosures of which are herein incorporated by reference in their entireties, which generally disclose the use of solid acid catalysts to polymerize monomers for the preparation of resins include U.S. Pat. No. 4,068,062 to LEPERT, U.S. Pat. No. 4,130,701 to LEPERT, U.S. Pat. No. 4,245,075 to LEPERT, and U.S. Pat. No. 4,824,921 to LUVINH.

SUMMARY OF THE INVENTION

The present invention involves the preparation of hydrocarbon resins. More particularly, the present invention involves the use of metal oxide solid acid catalysts to polymerize a feed of hydrocarbon monomers.

Hydrocarbon resins are prepared from at least one of pure monomer, C5 monomers, and C9 monomers using relatively environmentally benign, recyclable, metal oxide solid acid catalysts in which freely-associated water may have been removed. In the present invention, hydrocarbon resins are prepared by cationic polymerization (e.g., Friedel-Crafts) wherein a feed stream containing at least one of pure monomer, C5 monomers, and C9 monomers is treated with metal oxide solid acid catalyst.

Before use, the metal oxide solid acid catalysts are treated to remove freely-associated water associated with the solids to maximize catalyst acidity and activity toward the polymerization. For example, prior to use, the catalyst may be calcined for a sufficient time to remove freely-associated water and/or the catalyst may be exposed to reduced atmospheric pressure. For instance, the calcining may be at a temperature up to about 700° C., preferably at a temperature between about 50° C. and 500° C. The calcining may be under reduced atmospheric pressure for up to about 8 hours, preferably between about 1 hour to 4 hours.

In accordance with one aspect, the present invention is directed to a process for making a hydrocarbon resin, including polymerizing a feed stream comprising at least one member selected from the group consisting of pure monomer, C5 monomers, and C9 monomers in the presence of a metal oxide solid acid catalyst to produce a hydrocarbon resin, wherein substantially all freely-associated water has been removed from the metal oxide solid acid catalyst.

In one aspect of the present invention, the metal oxide solid acid catalyst comprises heteropolyacid intercalated clay.

In accordance with another feature of the present invention, the metal oxide solid acid catalyst comprises at least one member selected from the group consisting of heteropolyacid and salts thereof comprising at least one member selected from the group consisting of tungstophosphoric acid, tungstosilicic acid, molybdophosphoric acid, molybdosilicic acid, mixed metal heteropolyacids, and salts thereof The heteropolyacid and salts thereof may be $Cs_n H_{(3-n)}PW_{12}O_{40}$ where n=2 to less than 3, preferably 2.50–2.98.

In accordance with a feature of the present invention, the metal oxide solid acid catalyst comprises at least one member selected from the group consisting of supported heteropolyacid and salts thereof comprising at least one member selected from the group consisting of silica supported heteropolyacid and salts thereof, sol-gel incorporated heteropolyacid and salts thereof, cation exchange resin supported heteropolyacid and salts thereof, clay supported heteropolyacid and salts thereof, clay intercalated heteropolyacid and salts thereof, mesoporous silica supported heteropolyacid and salts thereof, and mesoporous silica-alumina supported heteropolyacid and salts thereof.

In accordance with yet another feature of the present invention, the metal oxide solid acid catalyst may include sulfated zirconia, tungstated zirconia, sulfated titania, sulfated tungstate, acid functionalized organically bridged polysilsesquisiloxane, or niobic acid.

In accordance with a feature of the present invention, the metal oxide solid acid catalyst includes mixed oxide comprising at least one member selected from the group consisting of $B_2O_3.Al_2O_3$, $Cr_2O_3.Al_2O_3$, $MoO_3.Al_2O_3$, $ZrO_2.SiO_2$, $Ga_2O_3.SiO_2$, $BeO_2.SiO_2$, $MgO.SiO_2$, $CaO.SiO_2$, $SrO.SiO_2$, $Y_2O_3.SiO_2$, $La_2O_3.SiO_2$, $SnO.SiO_2$, $PbO.SiO_2$, $MoO_3.Fe(MoO_4)_3$, $MgO.B_2O_3$, and $TiO_2.ZnO$.

In accordance with yet another feature of the present invention, the metal oxide solid acid catalyst includes inorganic acid comprising at least one member selected from the group consisting of ZnO, $Al_2O_3$, $TiO_2$, $CeO_2$, $As_2O_3$, $V_2O_5$, $Cr_2O_3$, $MoO_3ZnS$, CaS, $CaSO_4$, $MnSO_4$, $NiSO_4$, $CuSO_4$, $CoSO_4$, $CdSO_4$, $SrSO_4$, $ZnSO_4$, $MgSO_4$, $FeSO_4$, $BaSO_4$, $KHSO_4$, $K_2SO_4$, $(NH_4)_2SO_4$, $Al_2(SO_4)_3$, $Fe_2(SO_4)_3$, $Cr_2(SO_4)_3$, $Ca(NO_3)_2$, $Bi(NO_3)_3$, $Zn(NO_3)_2$, $Fe(NO_3)_3$, $CaCO_3$, $BPO_4$, $FePO_4$, $CrPO_4$, $Ti_3(PO_4)_4$, $Zr_3(PO_4)_4$, $Cu_3(PO_4)_2$, $Ni_3(PO_4)_2$, $AlPO_4$, $Zn_3(PO_4)_2$, and $Mg_3(PO_4)_2$.

In accordance with another feature of the invention, the feed stream includes between about 20 wt % and 80 wt % monomers and about 80 wt % to 20 wt % of solvent. Preferably, the feed stream includes about 30 wt % to 70 wt % monomers and about 70 wt % to 30 wt % of solvent. More preferably, the feed stream includes about 50 wt % to 70 wt % monomers and about 50 wt % to 30 wt % of solvent. The solvent may include an aromatic solvent. The aromatic solvent may include at least one member selected from the group consisting of toluene, xylenes, and aromatic petroleum solvents. The solvent may include an aliphatic solvent. The invention may further include recycling the solvent.

In accordance with a feature of the invention, the feed stream includes at least C5 monomers. The feed stream may include at least C5 monomers, wherein cyclopentadiene and methylcyclopentadiene components are removed from the feed stream by heating at a temperature between about 100° C. and 160° C. and fractionating by distillation. The C5 monomers may include at least one member selected from the group consisting of isobutylene, 2-methyl-2-butene, 1-pentene, 2-methyl-1-pentene, 2-methyl-2-pentene, 2-pentene, cyclopentene, cyclohexene, 1,3-pentadiene, 1,4-pentadiene, isoprene, 1,3-hexadiene, 1,4-hexadiene, cyclopentadiene, and dicyclopentadiene. The feed stream may include at least C5 monomers, wherein the feed stream includes at least about 70 wt % of polymerizable monomers with at least about 50 wt % 1,3-pentadiene. The C5 feed stream may contain low levels of isoprene, generally contains a portion of 2-methyl-2-butene, and may contain one or more cyclodiolefins.

The feed stream may include at least C5 monomers, wherein the feed stream further includes up to about 40 wt % of chain transfer agent, preferably up to about 20 wt % of chain transfer agent. The chain transfer agent may include at least one member selected from the group consisting of C4 olefins, C5 olefins, dimers of C4 olefins, and dimers of C5 olefins. The chain transfer agent may include at least one member selected from the group consisting of isobutylene, 2-methyl-1-butene, 2-methyl-2-butene, dimers thereof, and oligomers thereof.

In accordance with a feature of the invention, the feed stream includes about 30 wt % to 95 wt % of C5 monomers and about 70 wt % to 5 wt % of a cofeed including at least one member selected from the group consisting of pure monomer, C9 monomers, and terpenes. Preferably, the feed stream includes about 50 wt % to 85 wt % of C5 monomers and about 50 wt % to 15 wt % of a cofeed including at least one member selected from the group consisting of pure monomer, C9 monomers, and terpenes.

In accordance with another feature of the invention, the feed stream includes at least C9 monomers. The C9 monomers may include at least one member selected from the group consisting of styrene, vinyl toluene, indene, dicyclopentadiene, and alkylated derivatives thereof. The C9 monomers may include at least about 20 wt % polymerizable unsaturated hydrocarbons. The C9 monomers may include about 30 wt % to 75 wt % polymerizable unsaturated hydrocarbons. The C9 monomers may include about 3 5 wt % to 70 wt % polymerizable unsaturated hydrocarbons.

In accordance with a feature of the invention, the feed stream includes about 30 wt % to 95 wt % of the C9 monomers and about 70 wt % to 5 wt % of a cofeed including at least one member selected from the group consisting of pure monomer, C5 monomers, and terpenes. Preferably, the feed stream includes about 50 wt % to 85 wt % of the C9 monomers and about 50 wt % to 15 wt % of a cofeed including at least one member selected from the group consisting of pure monomer, C5 monomers, and terpenes.

Many of the metal oxide solid acid catalysts function most effectively in the presence of a controlled amount of water in the monomer feed stream. In accordance with this feature of the invention, the feed stream should include less than about 500 ppm water, preferably less than about 200 ppm water, more preferably less than about 100 ppm water, and most preferably less than about 50 ppm water.

In accordance with yet another feature of the invention, the feed stream is contacted with about 0.5 wt % to 30 wt %, preferably about 1 wt % to 20 wt %, more preferably about 3 wt % to 15 wt %, and most preferably 0.5 wt % to 5 wt % of the metal oxide solid acid catalyst based on monomer weight in a batch reactor.

In accordance with a feature of the invention, the metal oxide solid acid catalyst is added to the feed stream.

In accordance with another feature of the invention, the feed stream is added to a slurry of the metal oxide solid acid catalyst in solvent. The feed stream may be passed over a fixed bed of the metal oxide solid acid catalyst.

In accordance with yet another feature of the invention, the feed stream is cofed with a slurry of the metal oxide solid acid catalyst into a reactor.

In accordance with a feature of the invention, the polymerization is carried out as a continuous process or as a batch process. A reaction time in the batch process is about 30 minutes to 8 hours, preferably about 1 hour to 4 hours at reaction temperature.

In accordance with a feature of the invention, the feed stream is polymerized at a reaction temperature between about −50° C. and 1 50° C., preferably between about −20° C. and 100° C., and more preferably between about 0° C. and 70° C.

In accordance with another feature of the invention, the polymerization is stopped by removing the metal oxide solid acid catalyst from the hydrocarbon resin. The metal oxide solid acid catalyst may be removed from the hydrocarbon resin by filtration. The hydrocarbon resin may be removed from a fixed bed reactor which includes the metal oxide solid acid catalyst.

In accordance with a feature of the invention, the hydrocarbon resin is stripped to remove unreacted monomers, solvents, and low molecular weight oligomers. The unreacted monomers, solvents, and low molecular weight oligomers may be recycled.

In accordance with a feature of the invention, the hydrocarbon resin is separated from a hydrocarbon resin solution.

In accordance with a feature of the invention, the feed stream includes at least pure monomer and the resulting hydrocarbon resin has a softening point as measured by ASTM-E28 "Standard Test Method for Softening Point by Ring and Ball Apparatus", between about 5° C. and 170° C. The feed stream may include at least C5 monomers, wherein the softening point of the resulting hydrocarbon resin is between about 50° C and 150° C. The feed stream may include at least C9 monomers, wherein the softening point of the resulting hydrocarbon resin is between about 70° C. and 160° C.

In accordance with a feature of the invention, the feed stream includes at least pure monomer, wherein the hydrocarbon resin has a number average molecular weight (Mn) ranging from about 400 to 2000, a weight average molecular weight (Mw) ranging from about 500 to 5000, a Z average molecular weight (Mz) ranging from about 500 to 10,000, and a polydispersity (PD) as measured by Mw/Mn between about 1.2 and 3.5, where Mn, Mw, and Mz are determined by size exclusion chromatography (SEC).

In accordance with a feature of the invention, the feed stream includes at least C5 monomers, wherein the hydrocarbon resin has a number average molecular weight (Mn) of about 400 to 2000, a weight average molecular weight (Mw) of about 500 to 3500, a Z average molecular weight (Mz) of about 700 to 15,000, and a polydispersity (PD) as measured by Mw/Mn between about 1.2 and 5, where Mn, Mw, and Mz are determined by size exclusion chromatography (SEC).

In accordance with another feature of the invention, the feed stream includes at least C9 monomers, wherein the hydrocarbon resin has a number average molecular weight (Mn) of about 400 to 1200, a weight average molecular weight (Mw) of about 500 to 2000, a Z average molecular weight (Mz) of about 700 to 6000, and a polydispersity (PD) as measured by Mw/Mn between about 1.2 and 3.5, preferably 1.2 and 2.5, where Mn, Mw, and Mz are determined by size exclusion chromatography (SEC).

In accordance with another feature of the invention, the hydrocarbon resin is hydrogenated.

DETAILED DESCRIPTION OF THE INVENTION

The particulars shown herein are by way of example and for purposes of illustrative discussion of the various embodiments of the present invention only and are presented in the cause of providing what is believed to be the most useful and readily understood description of the principles and conceptual aspects of the invention. In this regard, no attempt is made to show details of the invention in more detail than is necessary for a fundamental understanding of the invention, the description making apparent to those skilled in the art how the several forms of the invention may be embodied in practice.

All percent measurements in this application, unless otherwise stated, are measured by weight based upon 100% of a given sample weight. Thus, for example, 30% represents 30 weight parts out of every 100 weight parts of the sample.

Unless otherwise stated, a reference to a compound or component includes the compound or component by itself, as well as in combination with other compounds and components, such as mixtures of compounds.

Before further discussion, a definition of the following terms will aid in the understanding of the present invention.

SOLID ACID: a solid which changes the color of a basic Hammett indicator with a $pK_a < 0$.

METAL OXIDE SOLID ACID: a solid acid comprising a metal which is exclusively covalently bonded to oxygen, exclusive of alumino-silicates, e.g., including metal phosphates, metal nitrates, and metal sulfates.

HETEROPOLYACID: a solid acid comprising a heteropolyacid counterion and a heteropolyacid anion having complementing charge.

HETEROPOLYACID COUNTERION: a cationic species, e.g., $H^+$, $Na^+$, $K^+$, $Cs^+$, $Al^{3+}$, or $NH_3^+$.

HETEROPOLYACID ANION: an anion having the general formula $X_xM_mO_y^{z-}$, where X=a heteroatom or central atom which is different from M; M=an early transition metal in highest oxidation state; O=oxygen; z−=the charge of the anion; and x, m, and y represent the molar ratio of the atomic components X, M, and O respectively; and where M is, e.g., Mo, W, V, Nb, or Ta; and where X is, e.g., P, Si, or As.

KEGGIN HETEROPOLYACID: a heteropolyacid wherein the anion has the general formula $XM_{12}O_{40}^{3-}$, wherein four oxygens form a central tetrahedron around the heteroatom X, and twelve terminal and twenty-four bridged oxygen atoms form twelve octahedra of metal atoms M.

HYDROCARBON RESIN: a low molecular weight (i.e., a number average molecular weight of about 200 to less than about 3000 as determined by size exclusion chromatography (SEC)) thermoplastic polymer synthesized via thermal or catalytic polymerization of cracked petroleum distillates, terpenes, coal tar fractions, or pure olefinic monomers, wherein one of the monomers is at least a C5 or higher.

PURE MONOMER: a composition comprising synthetically generated or highly purified monomer species, e.g., styrene from ethyl benzene or alpha-methyl styrene from cumene.

PURE MONOMER FEED STREAM: a composition comprising any number of pure monomer species.

C5 MONOMERS: a composition derived from petroleum processing, e.g., cracking, containing unsaturated hydrocarbons comprising C5 and/or C6 olefin species boiling in the range from about 20° C. to 100° C. at atmospheric pressure.

C9 MONOMERS: a composition derived from petroleum processing, e.g., cracking, containing unsaturated aromatic C8, C9, and/or C10 olefin species with a boiling range of about 100° C. to 300° C. at atmospheric pressure.

FREELY-ASSOCIATED WATER: water associated with a solid acid catalyst where the water is chemisorbed and/or physisorbed.

As a general overview of the present invention, hydrocarbon resins are produced by using metal oxide solid acids as catalysts for the cationic polymerization of a feed stream containing at least one of pure monomer (e.g., styrene based monomers), C5 monomers, and C9 monomers. Resins with softening points (Ring and Ball) preferably in the range of about 5° C. to 170° C., more preferably about 30° C. to 150° C., can be prepared. These catalysts offer advantages over the traditional Lewis acid polymerization catalysts since the acid sites are an integral part of the solid.

Looking at the present invention in more detail, hydrocarbon resins are prepared through a polymerization reaction wherein a feed stream containing at least one of pure monomer, C5 monomers, and C9 monomers in a solvent are contacted with a metal oxide solid acid catalyst. Metal oxide solid acid catalysts which are useful in the current invention include, but are not limited to, the following.

Heteropolyacid Intercalated Clays (i.e., the Heteropolyacid Acts as a Pillar Between Clay Layers)

Heteropolyacids and salts thereof, for example

Tungstophosphoric acid and salts, including for example $Cs_nH_{(3-n)}PW_{12}O_{40}$, e.g., where n=2 to less than 3, and more preferably 2.50 to 2.98

Tungstosilicic acid and salts

Molybdophosphoric acid and salts

Molybdosilicic acid and salts

Mixed metal heteropolyacids and salts

Supported heteropolyacids and salts thereof, for example

Silica supported, for example $H_3PWO_{40}$ on silica

Sol-gel incorporated, for example
    $Cs_nH_{(3-n)}PWO_{40}$ incorporated in sol-gel
Cation exchange resin supported, for example
    $H_3PWO_{40}$ on cation exchange resin
Clay supported, for example
    $H_3PWO_{40}$ on clay
Clay intercalated heteropolyacids, for example
    clay intercalated with $H_3PWO_{40}$
Mesoporous silica supported, for example
    $H_3PWO_{40}$ supported on mesoporous silica
Mesoporous silica-alumina supported, for example
    $H_3PWO_{40}$ on mesoporous silica-alumina
Sulfated zirconia
Tungstated zirconia
Sulfated titania
Sulfated tungstates
Acid functionalized organically bridged polysilsesquisiloxanes
Niobic acid
Mixed Oxides
    $B_2O_3.Al_2O_3$
    $Cr_2O_3.Al_2O_3$
    $MoO_3.Al_2O_3$
    $ZrO_2.SiO_2$
    $Ga_2O_3.SiO_2$
    $BeO_2.SiO_2$
    $MgO.SiO_2$
    $CaO.SiO_2$
    $Y_2O_3.SiO_2$
    $La_2O_3.SiO_2$
    $SnO.SiO_2$
    $PbO.SiO_2$
    $MoO_3.Fe(MoO_4)_3$
    $MgO.B_2O_3$
    $TiO_2.ZnO$
Inorganic Acids
    $ZnO$
    $Al_2O_3$
    $TiO_2$
    $CeO_2$
    $As_2O_3$
    $V_2O_5$
    $Cr_2O_3$
    $MoO_3$
    $CaSO_4$
    $MnSO_4$
    $NiSO_4$
    $CuSO_4$
    $CoSO_4$
    $CdSO_4$
    $SrSO_4$
    $ZnSO_4$
    $MgSO_4$
    $FeSO_4$
    $BaSO_4$
    $KHSO_4$
    $K_2SO_4$
    $(NH_4)_2SO_4$
    $Al_2(SO_4)_3$
    $Fe_2(SO_4)_3$
    $Cr_2(SO_4)_3$
    $Ca(NO_3)_2$
    $Bi(NO_3)_3$
    $Zn(NO_3)_2$
    $Fe(NO_3)_3$
    $CaCO_3$
    $BPO_4$
    $FePO_4$
    $CrPO_4$
    $Ti_3(PO_4)_4$
    $Zr_3(PO_4)_4$
    $Cu_3(PO_4)_2$
    $Ni_3(PO_4)_2$
    $AlPO_4$
    $Zn_3(PO_4)_2$
    $Mg_3(PO_4)_2$ As mentioned previously, the above list of metal oxide solid acid catalysts is not intended to be an exhaustive list. In selecting other metal oxide solid acid catalysts which may be useful in the present invention, it is generally true that the metal oxide solid acid catalyst should be more acidic than about −3 on the Hammett scale.

Concerning the heteropolyacid salts, desirable counterions include for example cesium, aluminum, potassium, sodium, and ammonium.

Concerning the tungstophosphoric salts, it is noted that n should be less than 3 because a proton should be present to have catalytic action.

Concerning the supported heteropolyacids and salts thereof, during the development of supported catalyst systems, a first step in a catalytic process would be the identification of a catalyst which in its pure form catalyzes the desired transformation. Once a catalyst system is identified, one of the key development strategies is to support that catalyst on an support such that the active catalyst component is spread out over a large surface area. Examples of this strategy include the supporting of noble metal catalysts on the surface of carbon or similar inert material for hydrogenation catalysts. In the case of heteropolyacids where the crystallite size is 8 nm (nanometers), only the surface atoms of this crystallite would normally catalyze the reaction. Thus, to increase the efficiency of using the heteropolyacids, heteropolyacids were supported on solids with high surface area. Although the preferred unsupported catalyst is as a salt such as $Cs_{2.9}H_{0.1}PW_{12}O_{40}$, the preferred supported heteropolyacid is the parent heteropolyacid $H_3PW_{12}O_{40}$. Reference is made to OKUHARA et al., "Catalytic Chemistry of Heteropoly Compounds", *Advances in Catalysis*, Vol. 41, pp. 113–252 (1996), and MISONO et al., "Solid Superacid Catalysts", *Chemtech*, pp 23–29 (November 1993); the disclosures of which are herein incorporated by reference in their entireties.

Supports for the supported metal oxides include clays. Clays include naturally occurring clay minerals such as kaolinite, bentonite, attapulgite, montmorillonite, clarit, Fuller's earth, hectorite, and beidellite. Clays also include synthetic clays such as saponite and hydrotalcite. Clays further include montmorillonite clays treated with sulfuric or hydrochloric acid. Even further, clays include modified clays (i.e., clays modified by backbone element replacement), such as aluminum oxide pillared clays, cerium modified alumina pillared clays, and metal oxide pillared clays. In addition to clays, other supports include silica, silica-alumina, mesoporous silica, mesoporous silica-alumina, and ion exchange resins. Other types of supports includes natural or synthetic zeolites such as zeolite Y, zeolite β (i.e., BEA), MFI (e.g., "Zeolite Sacony Mobil-5" ("ZSM-5")), MEL (e.g., "Zeolite Sacony Mobil-11" ("ZSM-11")), NaX, NaY, faujasite (i.e., FAU), and mordenite (i.e., MOR). The names BEA, MFI, MEL, FAU, and MOR are the framework structure type IUPAC definitions of the zeolites.

Examples of acid functionalized organically bridged polysilsesquisiloxanes are found in U.S. Pat. No. 5,475,162 to BRANDVOLD et al. and U.S. Pat. No. 5,371,154 to BRANDVOLD et al., the disclosures of which are herein incorporated by reference in their entireties.

Before use, the metal oxide solid acid catalysts are treated to remove freely-associated water to maximize the catalyst acidity and activity toward the polymerization. The freely-associated water may be removed by various techniques, including thermal treatment, reduced pressure treatment, dry atmosphere treatment such as nitrogen or air, or a combination thereof. While not wishing to be bound by theory, removing freely-associated water maximizes the acid strength of the metal oxide solid acid catalysts and makes the polymerizations more reproducible.

The freely-associated water is removed from the metal oxide solid acid catalyst by calcining which generally means heating the metal oxide solid acid catalyst to high temperature without fusing the catalyst. The metal oxide solid acid catalyst may be calcined under an inert atmosphere, such as nitrogen or dry air, or under reduced pressure. The calcining is preferably performed for up to about 8 hours or more, more preferably about 1 hour to 4 hours, preferably at temperatures up to about 700° C., more preferably about 100° C. to 400° C.

The freely-associated water removed from the metal oxide solid acid catalyst may have been derived from water (physisorbed water) or hydroxyl groups (chemisorbed water) associated with the metal oxide solid acid catalyst. By removal of substantially all freely-associated water is meant removing all or essentially all physisorbed water and removing at least a majority of chemisorbed water.

It is expected that by controlling the conditions under which the metal oxide solid acid catalyst is calcined, such as controlling the temperature or time under which the calcination step takes place, tailoring of the physical properties of the resultant resin, such as its softening point or its molecular weight, may be achieved.

Many of the metal oxide solid acid catalysts function most effectively in the presence of a controlled amount of water in the monomer feed stream. For instance, the feed stream may include less than about 500 ppm water, preferably less than about 200 ppm water, more preferably less than about 100 ppm water, and most preferably less than about 50 ppm water.

Pure monomer feed streams may contain relatively pure styrene-based monomers such as styrene, alpha-methyl styrene, beta-methyl styrene, 4-methyl styrene, and vinyl toluene fractions. The monomers can be used as pure components or as blends of two or more monomer feeds to give desired resin properties. Preferred blends include about 20 wt % to 90 wt % alpha-methyl styrene with about 80 wt % to 10 wt % of one or more comonomers, preferably styrene, vinyl toluene, 4-methyl styrene or blends of these components. In addition, other alkylated styrenes can be used as monomers in this invention such as t-butyl styrene or phenyl styrene. Feed streams can be dried, if desired, and preferably contain less than about 200 ppm water, more preferably less than about 100 ppm water, and most preferably less than about 50 ppm water.

In the case of C5 resins, the petroleum feed streams contain unsaturated C5 and/or C6 olefins and diolefins boiling in the range from about 20° C. to 100° C., preferably about 30° C. to 70° C. In some cases, cyclopentadiene and methylcyclopentadiene components are removed from the feed by heat soaking at temperatures preferably between about 100° C. and 160° C., and fractionating by distillation. Monomers found in these feedstocks may include but are not limited to olefins such as isobutylene, 2-methyl-2-butene, 1-pentene, 2-methyl-1-pentene, 2-methyl-2-pentene, as well as 2-pentene, cycloolefins such as cyclopentene, and cyclohexene, diolefins such as 1,3-pentadiene, 1,4-pentadiene, isoprene, 1,3-hexadiene, and 1,4-hexadiene, cyclodiolefins such as cyclopentadiene, dicyclopentadiene, and alkyl substituted derivatives and codimers of these cyclodiolefins. Commercial samples of this type of feed include, but are not limited to "Naphtha Petroleum 3 Piperylenes" from Lyondell Petrochemical Company, Houston, Tex., regular "Piperylene Concentrate" or "Super Piperylene Concentrate" both from Shell Nederland Chemie B. V., Hoogvilet, the Netherlands. The C5 feed streams generally contain at least about 70 wt % polymerizable monomers with at least about 50 wt % 1,3-pentadiene. The C5 feed stream may contain low levels of isoprene, generally contains 2-methyl-2-butene, and may contain one or more cyclodiolefins.

Also concerning C5 monomer feed streams, in addition to the reactive components, nonpolymerizable components in the feed may include saturated hydrocarbons which can be codistilled with the unsaturated components such as pentane, cyclopentane, or 2-methylpentane. This monomer feed can be copolymerized with C4 or C5 olefins or dimers as chain transfer agents. Chain transfer agents may be added to obtain resins with lower and narrower molecular weight distributions than can be prepared from using monomers alone. Chain transfer agents stop the propagation of a growing polymer chain by terminating the chain in a way which regenerates a polymer initiation site. Components which behave as chain transfer agents in these reactions include but are not limited to isobutylene, 2-methyl-1-butene, 2-methyl-2-butene or dimers or oligomers of these species. The chain transfer agent can be added to the reaction in pure form or diluted in a solvent. Feed streams can be dried if desired and preferably contain less than about 500 ppm water, more preferably less than about 200 ppm water, and most preferably less than about 50 ppm water.

In the case of C9 monomer resins, the feed streams contain unsaturated aromatic C8, C9, and/or C10 monomers with a boiling range of about 100° C. to 300° C. at atmospheric pressure. Aromatic C8–C10 feed streams (also referred to as C9 feed streams) can be derived from steam cracking of petroleum distillates. Monomers found in these feed stocks may include but are not limited to styrene, vinyl toluene, indene, dicyclopentadiene, and alkylated derivatives of these components. Commercial samples of this type of feed include but are not limited to "LRO-90" from Lyondell Petrochemical Company, Houston, Tex., "DSM C9 Resinfeed Classic" from DSM, Geleen, the Netherlands, "RO-60" and "RO-80" from Dow Chemical Company of Midland, Mich., and "Dow Resin Oil 60-L" from the Dow Chemical Company of Terneuzen, the Netherlands. The C9 feed stream generally contains at least about 20% by weight, preferably about 30% to 75% by weight, and most preferably about 35% to 70% by weight polymerizable unsaturated hydrocarbons. The remainder is generally alkyl substituted aromatics which can be incorporated into the resins by alkylation reactions. Feed streams can be dried if desired and preferably contain less than about 500 ppm water, more preferably less than about 200 ppm water, and most preferably less than about 50 ppm water.

The feed streams may be limited to pure monomer, C5 monomers, or C9 monomers. Alternatively, cofeed streams can be used in combination with main feed streams of pure monomer, C5 monomers, or C9 monomers. Depending upon the main feed stream, pure monomer, C5 monomers, C9 monomers, or even terpenes, and any combination thereof, may serve as a cofeed stream. Terpene feed stocks include but are not limited to d-limonene, alpha- and beta-pinene, as well as dipentene. Resins from blends of main feed streams with cofeed streams may be prepared in the range of about 30 wt % to 95 wt % main feed with about 70 wt % to 5 wt % of a cofeed, preferably about 50–85 wt % main feed and about 50 wt % to 15 wt % cofeed.

The polymerization feed stream preferably contains between about 20 wt % and 80 wt % monomers, more preferably about 30 wt % to 70 wt %, and most preferably about 40 wt % to 70 wt %. In the case of C5 resins, the feed may contain up to about 40 wt % of a chain transfer agent, more preferably up to about 20 wt %, chain transfer agents as discussed above. The feed stream also contains about 80 wt % to 20 wt % of a solvent such as toluene, octane, higher boiling aromatic solvent, aliphatic solvent, or solvent blend.

Regarding the solvents, for pure monomer polymerization, the preferred solvents are aromatic solvents. Typically toluene, xylenes, or light aromatic petroleum solvents such as "Aromatic 100" from Exxon Chemical Company, Houston, Tex., "HiSol 10" from Ashland Chemical Incorporated, Columbus, Ohio, and "Cyclosol 53" from Shell Chemical Company, Houston, Tex. can be used. These solvents can be used fresh or recycled from the process. The solvents generally contain less than about 200 ppm water, preferably less than about 100 ppm water, and most preferably less than about 50 ppm water.

For C5 polymerization, the preferred solvents are aromatic solvents. Generally, unreacted resin oil components are recycled through the process as solvent. In addition to the recycled solvents, toluene, xylenes, or aromatic petroleum solvents such as "Solvesso 100" from Exxon Chemical Company, Houston, Tex. and "Shellsol A" from Shell Chemical Company, Houston, Tex. can be used. These solvents can be used fresh or recycled from the process. The solvents generally contain less than about 500 ppm water, preferably less than about 200 ppm water, and most preferably less than about 50 ppm water.

For C9 polymerization, the preferred solvents are aromatic solvents. Generally, unreacted resin oil components are recycled through the process as solvent. In addition to the recycled solvents, toluene, xylenes, or aromatic petroleum solvents such as "Solvesso 100" from Exxon Chemical Company, Houston, Tex. and "Shellsol A" from Shell Chemical Company, Houston, Tex. can be used. These solvents can be used fresh or recycled from the process. The solvents generally contain less than about 200 ppm water, preferably less than about 100 ppm water, and most preferably less than about 50 ppm water.

Concerning the polymerization reaction conditions, a first important variable is the amount of metal oxide solid acid catalyst which is used. The metal oxide solid acids are preferably used at a level of about 0.1 wt % to 30 wt % based on the weight of the monomer. For pure monomer resins, the metal oxide solid acid concentration is preferably about 0.1 to 15 wt %, more preferably about 0.5 wt % to 10 wt %, and most preferably about 0.5 wt % to 8 wt %. For C5 monomers, the metal oxide solid acid concentration is preferably about 0.5 wt % to 30 wt %, more preferably about 1 wt % to 20 wt %, and most preferably about 3 wt % to 15 wt %. For C9 monomers, the metal oxide solid acid concentration is preferably about 0.5 wt % to 30 wt %, more preferably about 1 wt % to 20 wt %, and most preferably about 3 wt % to 15 wt %.

A second important variable in the reaction is the reaction sequence, i.e., the order and manner in which reactants are combined. In one reaction sequence, the catalyst can be added to a solution of the monomers incrementally while controlling the reaction temperature. Alternatively, in another reaction sequence, the monomer can be added incrementally to a slurry of the metal oxide solid acid catalyst in a solvent. For a set catalyst level and reaction temperature, substantially lower softening point resins are obtained when the monomer is added to a catalyst slurry. As discussed in more detail in the following paragraphs, lower molecular weights and narrow polydispersity, i.e., Mw/Mn, as measured by size exclusion chromatography, are obtained when the monomer is added to the catalyst solution compared with resins where the catalyst is added to the monomer.

The molecular weight averages of the resins were measured using size exclusion chromatography, SEC. The column set for the analysis consisted of four Waters "Ultrastyrogel" columns of 500, 500, 1000, and 100 Å pore size, in series, (Part Nos. WAT 010571, 010571, 010572, 010570 respectively) available from Waters Corporation, Milford, Mass. The molecular weight calibration was calculated from the peak elution times of a standard set of narrow molecular weight distribution polystyrene polymers. The calibration set encompassed 18 standards ranging in peak molecular weight from 162 to 43,900. The peak molecular weight of a narrow molecular weight standard is defined as equal to $(MwMn)^{1/2}$ (ASTM test method D3536-76). The calibration curve is defined by a third degree polynomial curve fit of a plot of log MW vs. $V_e/V_r$, where $V_e$ is the elution volume of the standard and $V_r$ is the elution volume of the reference peak, oxygen, present as dissolved air in the injected solution. The columns and detector cell (Hewlett-Packard Differential Refractometer) are maintained at 40° C. The solvent (mobile phase) was tetrahydrofuran containing 250 ppm butylated hydroxytoluene (BHT, 2,6-di-tert-butyl-4-methylphenol) as a stabilizer (the tetrahydrofuran with BHT being available from Burdick and Jackson, Muskegon, Mich.). The mobile phase reservoir is purged with helium and is maintained at a flow rate of 1 milliliter per minute. Under these conditions, BHT eluted at 35.86 minutes. Samples are dissolved in THF, 0.25% wt/vol, and filtered through a 0.45 micron pore size "TEFLON" (polytetrafluoroethylene) membrane filter prior to injection (200 microliters) into the chromatograph. The reported molecular weights are the "polystyrene equivalent" molecular weights as calculated from the calibration curve.

For the pure monomer resins, the resins produced using the current invention have number average molecular weights (Mn) ranging from about 400 to 2000, weight average molecular weights (Mw) ranging from about 500 to 5000, Z average molecular weights (Mz) ranging from about 500 to 10,000, and polydispersities (PD) as measured by Mw/Mn between about 1.2 and 3.5, typically between about 1.2 and 2.5. For the C5 hydrocarbon resins, the resins produced using the current invention have number average molecular weights (Mn) ranging from about 400 to 2000, weight average molecular weights (Mw) ranging from about 500 to 3500, Z average molecular weights (Mz) ranging from about 700 to 15,000, and polydispersities (PD) as measured by Mw/Mn between about 1.2 and 5, typically between about 1.2 and 3.5. For the C9 hydrocarbon resins, the resins produced using the current invention have number average molecular weights (Mn) ranging from about 400 to 1200, weight average molecular weights (Mw) ranging from about 500 to 2000, Z average molecular weights (Mz) ranging from about 700 to 6000, and polydispersities (PD) as measured by Mw/Mn between about 1.2 and 3.5, typically between about 1.2 and 2.5.

As mentioned previously, narrower polydispersities (PD) and lower molecular weights are obtained when the monomer is added to the catalyst solution than when the catalyst is added to the monomer. Taking into consideration the effect of the reaction sequence, polydispersities (PD) more narrow than those obtained using traditional Lewis acid Friedel-Crafts catalysts can be obtained using metal oxide solid acids if desired. For instance, when pure monomer is added to 0.8 wt % $CS_{2.9}H_{0.1}PW_{12}O_{40}$ catalyst at a temperature of −6 to −2° C. over 20 minutes, the hydrocarbon resin product has an Mw of 1540, an Mn of 720, an Mz of 3920, and a polydispersity (PD=Mw/Mn) of 2.2. In comparison, when 0.8 wt % of the $Cs_{2.9}H_{0.1}PW_{12}O_{40}$ catalyst is added to pure monomer at a temperature of 0° C. over 1 minute, the hydrocarbon resin product has an Mw of 3100, an Mn of 1170, an Mz of 7080, and a polydispersity (PD=Mw/Mn) of 2.7. The above data is from Examples 4 and 13 which, as noted above, have similar but different reaction conditions.

In view of the above, polydispersities (PD) more narrow than those obtained using traditional Lewis acid Friedel-Crafts catalysts can be obtained using metal oxide solid acids if desired. Narrow polydispersity is important to ensure compatibility of resin with polymers in end use applications.

A third important reaction variable is the reaction temperature. Polymerization temperatures between about −50° C. and 150° C. can be used in these reactions, however, more preferred reaction temperatures are between about −20° C. and 100° C., most preferred temperatures are between about 0° C. and 70° C. For pure monomer, the reaction temperature is preferably between about −50° C. and 100° C., more preferably between about −20° C. and 75° C., and most preferably between about −10° C. and 60° C. For C5 monomers, the reaction temperature is preferably between about −50° C. and 100° C., more preferably between about −20° C. and 75° C., and most preferably between about −10° C. and 70° C. For C9 monomers, the reaction temperature is preferably between about 0° C. and 150° C., more preferably between about 10° C. and 120° C., and most preferably between about 20° C. and 110° C. Temperature is found to have a significant effect on the properties of the resulting resins. Higher molecular weight and high softening point resins are prepared at lower reaction temperatures. The reaction time at reaction temperature is preferably between about 30 minutes and 8 hours, and more preferably between about 1 hour and 4 hours.

The polymerization process can be carried out as a continuous, semi-batch, or batch process in such diverse reactors as continuous, batch, semi-batch, fixed bed, fluidized bed, and plug flow. For instance, in continuous processes, a solution of the monomers can be passed over the catalyst in a fixed bed, or the monomers can be cofed with a catalyst slurry into a continuous reactor.

The reaction may be stopped by physically separating the solid catalysts from the products. Physical separation may render the reaction solution neutral. Furthermore, physical separation can be performed by simple filtration or by separation of the resin solutions from a fixed catalyst bed. As a result, physical separation is easy and complete such that, for some metal oxide solid acid catalysts, acid functionality and catalyst residue are not left in the resin product.

Thus, use of metal oxide solid acid catalysts minimizes or eliminates the need for extra processing steps to quench the reactions, neutralize the catalyst, and filter the catalyst salt residues from the resulting products.

Once the metal oxide solid acid catalyst and resin solution are separated, the resin solution can be stripped to remove unreacted hydrocarbons, solvents, and low molecular weight oligomers which can be recycled through the process. When pure monomer is reacted, water white resins can be obtained from this invention in yields of up to about 99% based on starting monomer.

Resins obtained from this invention typically have softening points as measured by ASTM-E28 "Standard Test Method for Softening Point by Ring and Ball Apparatus" (revised 1996), varying from preferably about 5° C. to 170° C., more preferably from about 30° C. to 150° C. For pure monomer, the softening points preferably range from about 5° C. to 170° C., more preferably from about 50° C. to 150° C. For C5 hydrocarbon resins, the softening point preferably ranges from about 5° C. to 170° C., more preferably from about 50° C. to 150° C., and most preferably about 70° C. to 1 30° C. For C9 hydrocarbon resins, the softening point is preferably up to about 170° C., and the softening point range is most preferably from about 70° C. to 160° C. Flowable resin or those that are liquids at room temperature can also be prepared if desired using proper reaction conditions.

After the resin is produced, it may be subsequently subjected to hydrogenation to reduce coloration and improve color stability. Hydrogenation of resins is well known in the art. For a discussion of hydrogenation, reference is made to U.S. Pat. No. 5,491,214 to DAUGHENBAUGH et al., which is incorporated herein by reference in its entirety.

The resins of the current invention can be used as modifiers in adhesives, sealants, printing inks, protective coatings, plastics, road markings, flooring, and as dry cleaning retexturizing agents.

The metal oxide solid acid catalysts of the present invention offer several advantages over Lewis acids (e.g., $AlCl_3$, $AlBr_3$, $BF_3$, complexes of $BF_3$, $TiCl_4$, and others which are traditionally used for Friedel-Crafts polymerizations). Many of these advantages are a result of the acid sites being an integral part of the solid catalysts.

Because the acid sites are an integral part of the solid catalyst, contamination of the resin products or solvents with catalyst residues is minimal. As a result, the metal oxide solid acid catalysts do not impart color to the hydrocarbon resins due to catalyst residues. If pure styrene-based monomers are used, the resulting resins can be water white.

The metal oxide solid acid catalysts of the present invention can generally be regenerated and recycled to thereby minimize waste disposal of spent catalyst. In contrast, the Lewis acids are generally single use catalysts.

Further, the metal oxide solid acid catalysts of the present invention are nonhazardous when compared with traditional Lewis acid catalysts such as $BF_3$ and $AlCl_3$. The catalysts of the present invention generally do not generate corrosive or hazardous liquid or gaseous acids on exposure to moisture.

The present invention will be further illustrated by way of the following Examples which are preceded by Catalyst Preparation Methods which are incorporated by the Examples. Examples 1–26 involve pure monomer resins, Examples 41–55 involve C5 resins, and Example 56 involves C9 resins. These examples are non-limiting and do not restrict the scope of the invention.

Unless stated otherwise, all percentages, parts, etc. presented in the examples are by weight.

Catalyst Preparation $H_3PW_{12}O_{40}$ was prepared by calcining hydrated salts at 250° C. under a flow of dry nitrogen.

The potassium and ammonium salts were prepared according to the following procedures. The molecular weight of the heteropolytungstic acid, $H_3PW_{12}O_{40}\cdot xH_2O$, was calculated by determining the number of associated waters by measuring the weight loss at 300° C. by thermogravimetric analysis and calculating the equivalent weight as water. The potassium or ammonium salts, $K_3PW_{12}O_{40}\cdot xH_2O$ or $(NH_4)_3PW_{12}O_{40}\cdot xH_2O$, were prepared by charging the acid, $H_3PW_{12}O_{40}\cdot xH_2O$, 20 g, 6.1 mmol, (Aldrich, Milwaukee, Wis.) to a 500 ml single neck round bottom flask containing a magnetic stirring bar. The acid was dissolved in 125 ml distilled water. Potassium carbonate, 1.26 g, 9.15 mmol, (Aldrich, Milwaukee, Wis.) or ammonium carbonate, 0.88 g, 9.15 mmol, (Aldrich, Milwaukee, Wis.) was dissolved in 25 ml distilled water and added dropwise to the vigorously stirred heteropolyacid solution over approximately 12 minutes. The resulting solution was stirred at room temperature for 2 hours and reduced to dryness at 100° C., 0.25 mm Hg. The products were recovered as fine white powders. A range of salts with the formula $(CATION)_nH_{(3-n)}PW_{12}O_{40}$, where (CATION) is any cationic counter ion, can be prepared similarly by changing the phosphotungstic acid to metal carbonate ratio. Prior to use, the phosphotungstic acid salts were pretreated at 250° C. (unless otherwise noted in Table 1) for 30 minutes under flowing nitrogen to remove bound water.

The cesium salt of the phosphotungstic acid was prepared according to the following procedures. The molecular weight of the heteropolytungstic acid, $H_3PW_{12}O_{40}\cdot xH_2O$, was calculated by determining the number of associated waters by measuring the weight loss at 300° C. by thermogravimetric analysis and calculating the equivalent weight as water. The cesium heteropolytungstic acid salt, $Cs_{2.9}H_{0.1}PW_{12}O_{40}$, was prepared by charging the acid, $H_3PW_{12}O_{40}\cdot xH_2O$ 30 g, 9.2 mmol, (Aldrich, Milwaukee, Wis.) to a 500 ml single neck round bottom flask containing a magnetic stirring bar. The acid was dissolved in 185 ml of distilled water. Cesium carbonate, 4.32 g, 13.3 mmol, (Aldrich, Milwaukee, Wis.) was dissolved in 35 ml of distilled water and added dropwise to the vigorously stirred heteropolyacid solution over 25 minutes. The resulting solution was stirred at room temperature for 2 hours and reduced to dryness at 100° C., 0.25 mm Hg. The product was recovered as a fine white powder. A range of Cs salts were prepared by changing the phosphotungstic acid to cesium carbonate ratio, e.g., as shown in Table 3.

The aluminum salt was prepared according to the following procedures. The molecular weight of the heteropolytungstic acid, $H_3PW_{12}O_{40}\cdot xH_2O$, was calculated by determining the number of associated waters by measuring the weight loss at 300° C. by thermogravimetric analysis and calculating the equivalent weight as water. The aluminum heteropolytungstic acid salt, $AlPW_{12}O_{40}\cdot xH_2O$, was prepared by charging the acid, $H_3PW_{12}O_{40}\cdot xH_2O$ 20 g, 6.1 mmol, (Aldrich, Milwaukee, Wis.) to a 500 ml single neck round bottom flask containing a magnetic stirring bar. The acid was combined with 60 ml of diethyl ether (Aldrich, Milwaukee, Wis.). Aluminum trisisopropoxide, $Al(OCH_3)_2)_3$, 1.25 grams, 6.1 mmol (Aldrich, Milwaukee, Wis.) was combined with 40 ml of diethyl ether and added dropwise to the stirred heteropolyacid solution. The resulting solution was stirred at 25° C. for 12 hours. The precipitated solids were filtered from the reaction solution, washed with 25 ml portions of diethyl ether, and dried under vacuum (0.15 mm Hg) at 80° C. to constant weight. The product was recovered as a fine white powder.

EXAMPLES 1–10

These examples illustrate the use of Keggin heteropolyacids as catalysts for the polymerization of styrene based pure monomer. Salts of Keggin phosphotungstic acid are found to be active catalysts for the preparation of hydrocarbon resins with styrene based pure monomer.

A 250 milliliter three neck flask was equipped with an overhead stirrer, reflux condenser, gas inlet and outlet ports, a thermometer, and a dropping addition funnel. The flask was charged with 86.6 grams of alpha-methyl styrene (reagent grade, Aldrich, Milwaukee, Wis.), 36.6 grams styrene (reagent grade, Aldrich, Milwaukee, Wis.), and 36.6 grams toluene (reagent grade, Aldrich, Milwaukee, Wis.). The solvent and monomers were dried over alumina prior to use.

The reaction mixture was cooled to 0° C. with an ice bath. The catalyst noted in Table 1, 1.0 grams (unless otherwise noted), was added to the stirred reaction flask over approximately one minute. An exotherm of up to 5° C. was typically observed. The reaction solution was stirred at 0° C. for 6 hours.

The resulting resin solutions were then vacuum filtered from the catalyst while still cold. The reaction flask and catalyst filter cake were rinsed with approximately 100 milliliters of toluene. The resin was stripped of solvent and volatile products at 0.25 mm Hg while gradually increasing the temperature to 170° C. and maintaining the strip temperature for 15 minutes upon complete removal of volatile components.

The resins produced using various phosphotungstic acid salts have the properties listed in Table 1.

TABLE 1

| Ex. | Catalyst | Yield | Softening Point (R&B) | Mn | Mw | Mz | PD |
|---|---|---|---|---|---|---|---|
| 1 | $H_3PW_{12}O_{40}$ | 10% | — | 510 | 1320 | 6470 | 2.6 |
| 2 | $Cs_3PW_{12}O_{40}$ | 40% | 134° C. | 1460 | 3430 | 6680 | 2.3 |
| 3 | $Cs_{2.9}H_{0.1}PW_{12}O_{40}$ | 54% | 115° C. | 880 | 1680 | 3330 | 1.9 |
| 4 | $Cs_{2.9}H_{0.1}PW_{12}O_{40}$[a] | 52% | 139° C. | 1170 | 3100 | 7080 | 2.7 |
| 5 | $(NH_4)_3PW_{12}O_{40}$ | 43% | 40° C. | 440 | 810 | 2470 | 1.8 |
| 6 | $K_3PW_{12}O_{40}$ | 5% | — | 770 | 1850 | 4270 | 2.4 |
| 7 | $K_{2.5}H_{0.5}PW_{12}O_{40}$ | 48% | 43° C. | 450 | 1010 | 3270 | 2.2 |
| 8 | $AlPW_{12}O_{40}$ | 42% | 71° C. | 620 | 1390 | 3680 | 2.3 |
| 9 | $AlPW_{12}O_{40}$[a] | 42% | 125° C. | 990 | 3650 | 13610 | 3.7 |
| 10 | $AlPW_{12}O_{40}$[b] | 27% | 76° C. | 600 | 1520 | 4190 | 2.6 |

[a]Catalyst was calcined at 400° C.
[b]0.5 grams catalyst used

The fully substituted heteropolyacid in Examples 2, 5, 8, 9, and 10 show resin formation higher than expected for a catalyst where all the acid sites have been replaced. This indicates that the preparation of these catalysts did not fully replace all protons from the $H_3PW_{12}O_{40}$ base material leaving residual acid functionality on the catalyst, and this residual acid functionality should be responsible for the observed catalytic behavior. As noted above, a proton should be present to have catalytic activity. In the case where the reaction was forced to completion by use of excess counter ion (e.g., see Example 20), the catalyst activity is decreased as expected.

EXAMPLES 11–13

The following examples illustrate the effect of adding monomer to a catalyst slurry in solvent for the preparation of hydrocarbon resins with styrene based pure monomer using heteropolyacid catalysts. These examples also serve to illustrate the use of molybdenum based heteropolyacids.

Xylene, 50 milliliters (Aldrich, Milwaukee, Wis.) and either $H_3PMo_{12}O_{40}$ or $Na_3PW_{12}O_{40}$, 0.5 grams (Osram Sylvania Inc., Towanda, Pa.) which had been calcined at 250° C. for one hour under vacuum were added to a nitrogen flushed reaction vessel fitted with a magnetic stirring bar and a thermocouple thermometer. The catalyst slurry was cooled to −5° C. and the monomers, alpha-methyl styrene (25.0 grams, 0.19 mol) and styrene (25.0 grams, 0.22 mol) (both from Aldrich, Milwaukee, Wis.), were added over two minutes to the stirred solution. An exotherm of approximately 10° C. was observed for both reactions. The solutions were stirred at 0° C. for 10 to 15 minutes and then allowed to warm to room temperature. The reaction solution was stirred at room temperature for approximately 15 hours. The reaction solutions were filtered from the solid catalysts and the solvent and volatile products were removed on a rotary evaporator at 100° C. at 0.5 mm Hg.

The resins produced have the properties listed in Table 2.

TABLE 2

| | | | Molecular Weight | | | |
|---|---|---|---|---|---|---|
| Example | Catalyst | Yield | Mn | Mw | Mz | PD |
| 11 | $H_3PMo_{12}O_{40}$ | 78% | 320 | 450 | 780 | 1.5 |
| 12 | $Na_3PW_{12}O_{40}$ | 66% | 330 | 540 | 1890 | 1.6 |

For Example 13, a jacketed 250 milliliter three neck flask was equipped with an overhead stirrer, reflux condenser, gas inlet and outlet ports, a thermometer, and a dropping addition funnel. The nitrogen flushed flask was charged with toluene solvent, 36.3 g, (Aldrich, Milwaukee, Wis.) which had been dried over activated 4 angstrom molecular sieves and cesium heteropolytungstic acid, $Cs_{2.9}H_{0.1}PW_{12}O_{40}$, 1.0 gram, prepared as described in Examples 1–10 above and calcined at 400° C. for 30 minutes. The catalyst slurry was cooled to approximately −2° C. using a cooling bath recirculated through the reactor jacket. The monomers, 61.6 grams of alpha-methyl styrene and 61.6 grams styrene (both reagent grade, Aldrich, Milwaukee, Wis.), were dried over alumina and added to a dropping addition funnel attached to the reaction flask. The monomers were added to the catalyst slurry dropwise over approximately 20 minutes while maintaining the reaction temperature between −6.0 and −2.0° C. The reaction solution was then held at −2.0° C. to give a total reaction time of 2 hours.

The resulting resin solutions were vacuum filtered from the catalyst at room temperature. The reaction flask and catalyst filter cake were rinsed with approximately 50 milliliters of toluene. The resin was stripped of solvent and volatile products at 0.06 mm Hg by gradually heating the solution to 175° C. and maintaining this strip temperature for 15 minutes upon complete removal of volatile components.

The resin produced in Example 13 has the following properties.

| Resin yield | 21% |
|---|---|
| Softening Point | 97° C. |
| Molecular Weight | |
| Mn | 720 |
| Mw | 1540 |
| Mz | 3920 |
| PD | 2.2 |

Since the reactions of Example 13 and Example 4 are similar, the properties of the resin of Example 13 which involves monomer addition to catalyst may be compared with the properties of the resin of Example 4 which involves catalyst addition to monomer. As previously noted, narrower polydispersities (PD) and lower molecular weights are obtained when the monomer is added to the catalyst solution than when the catalyst is added to the monomer. In Example 13, when pure monomer is added to 0.8 wt % $Cs_{2.9}H_{0.1}PW_{12}O_{40}$ catalyst at a temperature of −6 to −2° C. over 20 minutes, the hydrocarbon resin product has an Mw of 1540, an Mn of 720, an Mz of 3920, and a polydispersity (PD=Mw/Mn) of 2.2. In comparison, in Example 4, when 0.8 wt % of the $Cs_{2.9}H_{0.1}PW_{12}O_{40}$ catalyst is added to pure monomer at a temperature of 0° C. over 1 minute, the hydrocarbon resin product has an Mw of 3100, an Mn of 1170, an Mz of 7080, and a polydispersity (PD=Mw/Mn) of 2.7.

EXAMPLES 14–20

These examples illustrate the use of cesium salts of a Keggin heteropolyacid as catalysts for the polymerization of styrene based pure monomer to prepare hydrocarbon resins.

A jacketed 500 milliliter three neck flask was equipped with an overhead stirrer, reflux condenser, gas inlet and outlet ports, a thermometer, and a dropping addition funnel. The flask was charged with 86.6 grams of alpha-methyl styrene (reagent grade, Aldrich, Milwaukee, Wis.), 36.6 grams styrene (reagent grade, Aldrich, Milwaukee, Wis.), and 36.6 grams toluene (reagent grade, Aldrich, Milwaukee, Wis.). The solvent and monomers were dried over alumina prior to use. The cesium phosphotungstic acid salt catalyst was pretreated at 250° C. for 30 minutes under flowing nitrogen to remove bound water. The reaction mixture was cooled to 0° C. by recirculating water from an ice bath in the reactor jacket. The catalyst, 0.5 to 1.0 wt % based on monomers, was added to the stirred reaction flask. An exotherm of 5° C. was typical. The reaction solution was stirred at 0° C. for 2.5 hours.

The resulting resin solutions were vacuum filtered from the catalyst at room temperature. The reaction flask and catalyst filter cake were rinsed with approximately 100 milliliters of toluene. The resin was stripped of solvent and volatile products at 0.5 mm Hg by gradually heating the solution to 185° C. and maintaining this strip temperature for 15 minutes upon complete removal of volatiles.

The resins produced using various cesium phosphotungstic acid salts have the properties listed in Table 3. Examples 14–18 are in accordance with the present invention, whereas Comparison Examples 19 and 20 are for comparison purposes.

TABLE 3

| Example | Molar ratio of Cs to $H_3PW_{12}O_{40}$ used in making the Cs salt | Yield | Softening Point (R&B) |
|---|---|---|---|
| 14 | 2.0 | 3% | Liquid |
| 15 | 2.2 | 13% | Liquid |
| 16 | 2.5 | 46% | 45° C. |
| 17 | 2.8 | 55% | 115° C. |
| 18 | 2.9 | 81% | 116° C. |
| 19 | 3.0 | 37% | 113° C. |
| 20 | 3.2 | 2% | Liquid |

EXAMPLES 21–23

These examples serve to illustrate the reuse of the cesium phosphotungstic acid catalysts for the preparation of hydrocarbon resins with styrene based pure monomer.

The reaction apparatus and procedures were similar to those outlined in Examples 14–20 with the following exceptions. The catalyst was charged to the reaction solution in three equal portions over the first 30 minutes of the reaction. The catalyst was collected after each polymerization by filtration, washed in refluxing toluene, heated to 150° C. for 30 minutes under flowing nitrogen, and reused.

The resins produced have the properties listed in Table 4.

TABLE 4

| Example | Catalyst | Yield | Softening Point (R&B) |
|---|---|---|---|
| 21 | $Cs_{2.9}H_{0.1}PW_{11}O_{40}$ | 93% | 70° C. |
| 22 (first reuse of catalyst) | $Cs_{2.9}H_{0.1}PW_{11}O_{40}$ | 94% | 68° C. |
| 23 (second reuse of catalyst) | $Cs_{2.9}H_{0.1}PW_{11}O_{40}$ | 91% | 66° C. |

EXAMPLES 24–26

These examples illustrate the use of heteropolyacids for the polymerization of pure monomer.

For Comparison Example 24, a 50:50 alpha-methyl styrene/styrene mixture was polymerized in toluene at 0–10° C. by using $Cs_3PW_{12}O_{40}$. The resin produced in Example 24 had the following properties.

| Softening Point (R&B) | 68° C. |
|---|---|
| Molecular Weight | |
| Mn | 650 |
| Mw | 1349 |
| Mz | 3280 |
| PD | 2.08 |

For Comparison Example 25, a neat monomer 50:50 alpha-methyl styrene/styrene mixture was polymerized by using $Cs_3PW_{12}O_{40}$. The resin produced in Example 25 was an essentially colorless, brittle solid at room temperature and had the following properties.

| Softening Point (R&B) | 105° C. |
|---|---|
| Molecular Weight | |
| Mn | 953 |
| Mw | 2315 |
| Mz | 5288 |
| PD | 2.42 |

For Example 26, a 50:50 alpha-methyl styrene/styrene mixture was polymerized in toluene at 0–10° C. by using $Cs_{2.5}H_{0.5}PW_{12}O_{40}$ to essentially quantitative yield. The resin produced in Example 26 was a semi-solid at room temperature and had the following properties.

| Molecular Weight | |
|---|---|
| Mn | 380 |
| Mw | 612 |
| Mz | 1582 |
| PD | 1.75 |

EXAMPLE 27

This example demonstrates the use of cesium modified heteropolyacids to polymerize pure monomer.

A 500 milliliter three neck flask was equipped with a cooling jacket, overhead stirrer, reflux condenser, gas inlet and outlet ports, thermometer, and dropping addition funnel. The flask was charged with 86.6 grams of vinyl toluene (Deltech Corporation, Baton Rouge La.), 36.6 grams of alpha-methyl styrene (reagent grade, Aldrich, Milwaukee, Wis.), and 100 grams of toluene (reagent grade, Aldrich, Milwaukee, Wis.). Prior to the reaction, the vinyl toluene was dried over molecular sieve and anhydrous calcium chloride (reagent grade, Aldrich, Milwaukee, Wis.). Also prior to the reaction, the toluene was dried over 3 angstrom molecular sieves.

After drying 1.48 grams of $Cs_{2.9}H_{0.1}PW_{12}O_{40}$ at 200° C. for 30 minutes, the catalyst was added to the reaction mixture. The reaction temperature was maintained at −5° C.±2° C. for 10 minutes and then raised to 0° C.±2° C. and held at that temperature for an additional 170 minutes for a total reaction time of 180 minutes.

At the end of the reaction time, the catalyst was filtered from the resin solution. The resin solution was rotary evaporated with a final condition of 45 minutes at a bath temperature of 190° C. at <5 mm Hg. The resultant yield was 68.3 grams or 55%. The softening point of the resin was 92° C. The number average, weight average, and Z average molecular weights as determined by SEC were 809, 2009, 4888.

EXAMPLES 28–31

These examples illustrate using supported cesium modified and unmodified heteropolyacids to polymerize pure monomer.

Supported Catalyst Preparation

The catalysts were prepared by using an incipient wetness technique. Three different loadings of heteropolyacid on a silica were prepared according to the following technique.

The heteropolyacid, phosphotungstic acid (Aldrich, Milwaukee, Wis.) was dissolved in 150 ml water and then slowly added to 100 grams of silica gel, "Davisil Grade 710". The resultant wet silica gel was dried in a 75° C. oven for at least 24 hours. The amount of heteropolyacid added to the 100 grams of silica gel is shown in Table 5 below.

TABLE 5

| Example | Amount of heteropolyacid, grams | Description of Product after drying |
|---|---|---|
| 28 | 5 | white powder |
| 29 | 10 | Light brown product |
| 30 | 15 | Light brown product |

Polymerization

A 500 milliliter three neck flask was equipped with a cooling jacket, overhead stirrer, reflux condenser, gas inlet and outlet ports, thermometer, and dropping addition funnel. The flask was charged with 36.6 grams of styrene (reagent grade, Aldrich, Milwaukee, Wis.), 86.6 grams of alpha-methyl styrene (reagent grade, Aldrich, Milwaukee, Wis.), and 100 grams of toluene (reagent grade, Aldrich, Milwaukee, Wis.). Prior to the reaction, the styrene and alpha-methyl styrene were dried over molecular sieve and alumina (reagent grade, Aldrich, Milwaukee, Wis.). Also prior to use, the toluene was dried over 3 angstrom molecular sieves.

After drying 5.0 grams of the supported heteropolyacid at 400° C. for 60 minutes, the catalyst was added to the reaction mixture. The reaction temperature was maintained at 0° C.±6° C. for 180 minutes.

At the end of the reaction time, the catalyst was filtered from the resin solution. The resin solution was rotary evaporated with a final condition of 45 minutes with a bath temperature of 190° C. at <5 mm Hg.

The resulting resins had the properties listed in Table 6. Examples 28–30 are in accordance with the present invention, whereas Comparison Example 31 is for comparison purposes.

TABLE 6

| Example | Catalyst | Yield, % | Softening Point (R&B) | Molecular Weight | | |
|---|---|---|---|---|---|---|
| | | | | Mn | Mw | Mz |
| 28 | 5% HPA on "Davisil" | 8.8 | 101.4° C. | 613 | 1286 | 4813 |
| 29 | 10% HPA on "Davisil" | 55 | not determined | 387 | 888 | 2407 |
| 30 | 15% HPA on "Davisil" | 57 | 32.6° C. | 467 | 893 | 2392 |
| 31 | "Davisil" | 4.5 | not determined | 600 | 1190 | 3410 |

EXAMPLES 32–34

These examples illustrate the use of supported metal oxide solid acids to polymerize pure monomer.
Supported Catalyst Preparation The catalysts were prepared by using an incipient wetness technique. "Silica Grade 57" (W. R. Grace, Boca Raton, Fla.) was ground up in mortar pestle. The material that passed through a 30 mesh screen, but not a 60 mesh screen was used for the preparations. The heteropolyacid, phosphotungstic acid (Aldrich, Milwaukee, Wis.), 12.5 grams, was dissolved in 73 ml of water and then slowly added to 50 grams of the silica. The resultant wet silica gel was dried in a 75° C. oven for at least 24 hours.
Polymerization Resins were prepared with this catalyst according to the following procedure. The difference in each of the examples is the calcination temperature of the catalyst, as indicated in Table 7 below.

A 500 milliliter three neck flask was equipped with a cooling jacket, overhead stirrer, reflux condenser, gas inlet and outlet ports, thermometer, and dropping addition funnel. The flask was charged with 36.6 grams of styrene (reagent grade, Aldrich, Milwaukee, Wis. ), 86.6 grams of alpha-methyl styrene (reagent grade, Aldrich, Milwaukee, Wis.), and 100 grams of toluene (reagent grade, Aldrich, Milwaukee, Wis.). Prior to the reaction, the styrene and alpha-methyl styrene were dried over molecular sieve and alumina (reagent grade, Aldrich, Milwaukee, Wis.). Also prior to use, the toluene was dried over 3 angstrom molecular sieves.

The catalyst was added to the reaction mixture. The reaction temperature was maintained at 0° C.±6° C. for 180 minutes.

At the end of the reaction time, the catalyst was filtered from the resin solution. The resin solution was rotary evaporated with a final condition of 45 minutes with a bath temperature of 190° C. at <5 mm Hg. The resulting resins have the properties listed in Table 7.

TABLE 7

| Ex. | Calcination temp | Yield, % | Softening Point (R&B) | Molecular Weight | | |
|---|---|---|---|---|---|---|
| | | | | Mn | Mw | Mz |
| 32 | 250° C. | 76 | 58° C. | 490 | 972 | 4340 |
| 33 | 325° C. | 67 | 54° C. | 474 | 991 | 3692 |
| 34 | 400° C. | 63 | 56° C. | 478 | 1028 | 3593 |

EXAMPLES 35 and 36

These examples describe an attempt to position heteropolyacid at openings of pores of a silica support, and use of the supported catalyst to polymerize pure monomer.
Catalyst Preparation The catalysts were prepared by using an incipient wetness technique.
Catalyst Preparation for Example 35

"Silica Grade 57" (W. R. Grace, Boca Raton, Fla.) was ground up in mortar pestle. The material that passed through a 30 mesh screen, but not a 60 mesh screen was used for the preparations. The silica, 25 grams, was wetted with 28 ml of "RHS" (The amount of "RHS"of 28 ml was selected based on tests that showed that the silica sample would absorb 36.5 ml of water with no liquid water present.).

The heteropolyacid, 2.81 grams of phosphotungstic acid (Aldrich, Milwaukee, Wis.) was dissolved in 20 ml of water and added to the silica/"RHS" mixture. Then, the solid mixture was tumbled in a rotary evaporatory for 2 hours followed by rotary evaporation for 1 hour at 110° C. at 3 mm Hg. These samples were furthered dried overnight in a vacuum oven at 116° C. The catalyst was then calcined at 200° C. for 2 hours.
Catalyst Preparation for Example 36

"Silica Grade 57" (W. R. Grace, Boca Raton, Fla.) was ground up in mortar pestle. The material that passed through a 30 mesh screen, but not a 60 mesh screen was used for the preparations. The silica, 25 grams, was wetted with 37 ml of "RHS" (Hercules Incorporated, Wilmington, Del.) (The 28 ml was selected based on tests that showed that the silica sample would absorb 37 ml of water with no liquid water present.). The heteropolyacid, 2.81 grams of phosphotungstic acid (Aldrich, Milwaukee, Wis.) was dissolved in 20 ml of water and added to the silica/RHS mixture. Then, the solid mixture was tumbled in a rotary evaporatory for 2 hours followed by rotary evaporation for 1 hour at 110° C. at 3 mm Hg. These samples were furthered dried overnight in a vacuum oven at 116° C. The catalyst was calcined at 200° C. for 2 hours.
Polymerization Resins were prepared in accordance with the procedure of Examples 32–34. The resulting hydrocarbon resin had the properties listed in Table 8.

TABLE 8

| Example | Yield, % | Softening Point (R&B) | Molecular Weight | | |
|---|---|---|---|---|---|
| | | | Mn | Mw | Mz |
| 35 | 71 | 57° C. | 519 | 1309 | 4421 |
| 36 | 81 | 44° C. | 446 | 1076 | 4527 |

EXAMPLES 37–40

These examples describe an attempt to position heteropolyacid in cell walls of a silica support, and use of the supported catalyst to polymerize pure monomer.

Catalyst Preparation

The catalyst synthesis strategy of these Examples was suggested by a paper which was presented at the International Chemical Congress of Pacific Basin Societies, Dec. 17–22, 1995 by Y. Izumi, the disclosure of which is herein incorporated by reference in its entirety. The strategy involves using a sol gel technique to incorporate the heteropolyacid or cesium modified heteropolyacid into the silica gel structure.

To a 1 liter round bottom flask was added 10 grams of $Cs_{2.9}H_{0.1}PW_{12}O_{40}$. The cesium heteropolyacid had been prepared by the method noted in Catalyst Preparation Methods. Ethyl alcohol, 250 ml of 200 proof, was added and the solution was mixed for 1 hour. Then, 100 ml of water and 0.07 grams of 36% hydrochloric acid were added. Then, 277 grams of tetraethyl orthosilicate, 98% (Aldrich, Milwaukee, Wis. ) was added to the stirred solution over 60 minutes. The solution was held at 40° C. for 60 minutes. A reflux condenser was then added to the flask and the solution refluxed for 4 hours.

The resulting gel was transferred to another round bottom flask and the gel dehydrated by rotary evaporating at 50° C. and 50 mm Hg until no more water/ethanol was evaporated from the gel. The material was calcined in a tube furnace under a flow of dry nitrogen at 250° C. for 16 hours.

Similar preparations were done for $H_3PW_{12}O_{40}$, $CS_{2.5}H_{0.5}PW_{12}O_{40}$, and $CS_{2.7}H_{0.3}PW_{12}O_{40}$.

Polymerizations

Resins were prepared in accordance with the procedure of Examples 32–34, but if the reaction exothermed, the catalyst was added incrementally to control the exotherm at 0° C.±5° C. The resulting hydrocarbon resin had the properties listed in Table 9.

TABLE 9

| Example | Catalyst composition | Yield % | Softening Point (R&B) | Mn | Mw | Mz |
|---|---|---|---|---|---|---|
| 37 | $H_3PW_{12}O_{40}$ | 2 | Not determined | 756 | 5345 | 26281 |
| 38 | $Cs_{2.5}H_{0.5}PW_{12}O_{40}$ | 6 | 97.4° C. | 608 | 1649 | 9402 |
| 39 | $Cs_{2.7}H_{0.3}PW_{12}O_{40}$ | 36 | 101.4° C. | 616 | 1125 | 3748 |
| 40 | $Cs_{2.9}H_{0.1}PW_{12}O_{40}$ | 30 | 98.6° C. | 511 | 1024 | 3284 |

EXAMPLES 41–45

These examples illustrate the use of Keggin heteropolyacids as catalysts for the polymerization of piperylene, a C5 monomer feed.

Catalyst, 2 wt % based on monomer, prepared according to Catalyst Preparation Methods was added to an 8 ounce reaction vessel fitted with a rubber septum cap and sparged with nitrogen. Toluene, 25 milliliters, (reagent grade, Aldrich, Milwaukee, Wis.) was dried over 4 angstrom molecular sieves and added to the reaction vessel via syringe. Piperylene 25 milliliters, (90% technical grade, Aldrich, Milwaukee, Wis.) was added to the stirred catalyst solution at 0° C. to maintain an exotherm of under 10° C. (unless otherwise stated). After the monomer was added, the reaction solution was stirred at room temperature (unless otherwise stated) for 16 hours and then filtered. The volatile components were removed from the reaction solution under vacuum (0.2–0.5 mm Hg) with heating to 90° C.

Resins produced have the properties listed in Table 10.

TABLE 10

| | | | Molecular Weight | | | |
|---|---|---|---|---|---|---|
| Example | Catalyst | Yield | Mn | Mw | Mz | PD |
| 41 | $Cs_{2.5}H_{0.5}PW_{12}O_{40}$[1] | 74% | 440 | 1440 | 16,530 | 3.3 |
| 42 | $Cs_{2.5}H_{0.5}PW_{12}O_{40}$ | 63% | 550 | 1610 | 12,670 | 3.0 |
| 43 | $Cs_{2.5}H_{0.5}PW_{12}O_{40}$[2] | 53% | 480 | 1410 | 8480 | 2.9 |
| 44 | $Cs_3PW_{12}O_{40}$ | 4% | 850 | 2200 | 6230 | 2.6 |
| 45 | $AlPW_{12}O_{40}$ | 4% | — | — | — | — |

[1]Reaction performed at 55° C.
[2]Reaction exotherm kept below 5° C.

EXAMPLE 46

This example illustrates the effect of monomer addition to a slurry of the catalyst in a solvent, involving a C5 monomer feed.

A 500 milliliter three neck flask was equipped with an overhead stirrer, reflux condenser, gas inlet and outlet ports, thermometer, and a dropping addition funnel. The flask was charged with 60 grams of toluene (reagent grade, Aldrich Milwaukee, Wis.) and 2.8 g of $Cs_{2.9}H_{0.1}PW_{11}O_{40}$ catalyst, prepared in accordance with the procedure of Examples 41–45 and calcined at 375–400° C. under a dry nitrogen purge for 30 minutes. The monomer, 140 grams piperylene concentrate (Naphtha Petroleum 3 "Piperylenes" Lyondell Petrochemical Company, Houston, Tex.) was added to the dropping addition funnel. Prior to use, the monomers and solvent were dried over 4 angstrom molecular sieves. The reaction solution was heated to 50° C. and the monomer was added to the reaction flask from the dropping addition funnel over 25 minutes The reaction solution was stirred at 50° C. for 4–5 hours.

The resulting resin solution was then vacuum filtered from the heteropolyacid catalyst at room temperature. The reaction flask and catalyst filter cake were rinsed with approximately 100 milliliters of toluene. The solvent and volatile components were removed from the resin solution by heating the reaction solution slowly to 100° C. at 2–5 mm Hg. The reaction products were stripped for an additional 30 minutes when the temperature reached 100° C.

The resin produced has the following properties.

| Yield | | 14% |
|---|---|---|
| MW-SEC | Mn | 630 |
| | Mw | 1360 |
| | Mz | 5240 |

EXAMPLES 47 and 48

These examples illustrate the addition of the powdered catalyst incrementally to a stirred solution of the monomer in solvent, involving a C5 monomer feed.

A 500 milliliter three neck flask was equipped with an overhead stirrer, reflux condenser, gas inlet and outlet ports, and thermometer. The flask was charged with 60 grams toluene (reagent grade, Aldrich Milwaukee, Wis.) and 140 grams piperylene concentrate (Naphtha Petroleum 3 "Piperylenes"Lyondell Petrochemical Company, Houston, Tex.) via syringe. Prior to use, the monomers and solvent were dried over 4 angstrom molecular sieves. The catalyst, $Cs_{2.9}H_{0.1}PW_{11}O_{40}$, prepared in accordance with the procedure of Examples 41–45 and calcined under dry nitrogen as described in Table 11 below, was added to the reaction flask against a nitrogen purge in 4 equal increments one hour apart. The total reaction time was seven hours.

The resulting resin solution was then vacuum filtered from the heteropolyacid catalyst at room temperature. The reaction flask and catalyst filter cake were rinsed with approximately 100 milliliters of toluene.

After catalyst filtration, the resin oil was placed in a round-bottom flask which was fitted with a distillation head with an adaptor for an inlet tube, thermometer, and attached to a condenser and receiving flask. The resin oil was heated to 235° C. with a nitrogen purge followed by a steam purge at 235–245° C. to remove light oil products. The steam purge was continued until less than 1 ml of oil was collected per 100 ml of steam condensate or until 1000 ml of steam condensate was collected. The steam purge was followed by a nitrogen purge at 235° C. to remove water from the remaining resin.

The resin produced has the properties listed in Table 11.

TABLE 11

| Example | Catalyst | Yield | Molecular Weight | | | |
|---|---|---|---|---|---|---|
| | | | Mn | Mw | Mz | PD |
| 47 | $Cs_{2.9}H_{0.1}PW_{11}O_{40}$ 2 wt % Calc. 375-400° C./30 min $N_2$ | 8% | 1400 | 2390 | 7650 | 1.7 |
| 48 | $Cs_{2.9}H_{0.1}PW_{11}O_{40}$ 4.8 wt % Calc. 240–265° C./1 hr $N_2$ | 14% | 1210 | 2080 | 7920 | 1.7 |

EXAMPLES 49–51

These examples illustrate the effect of the cesium to proton ratio in the Keggin heteropolyacid catalysts on the polymerization of piperylene concentrate, involving a C5 monomer feed.

A 500 milliliter three neck flask was equipped with an overhead stirrer, reflux condenser, gas inlet and outlet ports, thermometer, liquid addition funnel, and solid addition funnel. The flask was charged with 60 grams toluene (reagent grade, Aldrich Milwaukee, Wis.) and approximately ⅓ of the total catalyst charge. The catalysts were prepared as described in Examples 41–45 and calcined at 250–265° C. under a nitrogen purge for 1 hour. The catalyst slurry was heated to 30° C. Piperylene concentrate (Naphtha Petroleum 3 "Piperylenes" Lyondell Petrochemical Company, Houston, Tex.), 140 grams, was added to the nitrogen purged reaction flask via the dropping addition funnel over 15 minutes maintaining the reaction temperature at 30° C. and stirred at 30° C. for an additional 30 minutes. The monomers and solvent were dried over 4 angstrom molecular sieves. The remaining heteropolyacid catalyst, total catalyst charge is 10 wt % total based on monomer, was added to the reaction solution in seven increments 15 minutes apart from the solid addition funnel maintaining the reaction at 30° C. The reaction solution was held at 30° C. for an additional 5 hours after the last catalyst addition.

The resulting resin solution was then vacuum filtered from the heteropolyacid catalyst at room temperature. The reaction flask and catalyst filter cake were rinsed with approximately 100 milliliters of toluene.

After catalyst filtration, the resin oil was placed in a round-bottom flask which was fitted with a distillation head with an adaptor for an inlet tube, thermometer, and attached to a condenser and receiving flask. The resin oil was heated to 235° C. with a nitrogen purge followed by a steam purge at 235–245° C. to remove the light oil products. The steam purge was continued until less than 1 ml of oil was collected per 100 ml of steam condensate or until 1000 ml of steam condensate was collected. The steam purge was followed by a nitrogen purge at 235° C. to remove water from the remaining resin.

The resins produced have the properties listed in Table 12.

TABLE 12

| Example | Catalyst | Yield | Molecular Weight | | | |
|---|---|---|---|---|---|---|
| | | | Mn | Mw | Mz | PD |
| 49 | $Cs_{2.5}H_{0.5}PW_{11}O_{40}$ | 16% | 1010 | 1630 | 5630 | 1.6 |
| 50 | $Cs_{2.75}H_{0.25}PW_{11}O_{40}$ | 28% | 990 | 1560 | 5450 | 1.6 |
| 51 | $Cs_{2.9}H_{0.1}PW_{11}O_{40}$ | 25% | 1160 | 1940 | 8370 | 1.7 |

EXAMPLES 52–55

These examples illustrate the reuse of cesium salts of Keggin heteropolyacids for the polymerization of piperylene concentrate, involving a C5 monomer feed.

The procedures are similar to those described for Examples 49–51 except the catalyst loading is 11 wt % based on monomer, the reaction temperature is 50° C., five additions of catalyst are carried out after the piperylene is added to the reaction solution, and the solution is maintained at reflux for 3 hours after the last catalyst addition.

The catalyst from the reactions was collected by centrifugation of the reaction solution. The solid catalyst was washed four times with hot toluene and dried under vacuum at 100° C. for 1–1.5 hours prior to reuse.

The resins produced have the properties listed in Table 13.

TABLE 13

| Ex. | Catalyst | Yield | Softening Point (R&B) | Molecular Weight | | | |
|---|---|---|---|---|---|---|---|
| | | | | Mn | Mw | Mz | PD |
| 52 | $Cs_{2.9}H_{0.1}PW_{11}O_{40}$ | 31% | 19° C. | 1040 | 1720 | 7610 | 1.7 |
| 53 | $Cs_{2.9}H_{0.1}PW_{11}O_{40}$ Reclaimed | 26% | 27° C. | 1040 | 1880 | 12080 | 1.8 |
| 54 | $Cs_{2.5}H_{0.5}PW_{11}O_{40}$ | 10% | 59° C. | 950 | 1880 | 10680 | 2.0 |
| 55 | $Cs_{2.5}H_{0.5}PW_{11}O_{40}$ Reclaimed | 6% | 56° C. | 960 | 1690 | 7260 | 1.8 |

EXAMPLE 56

This example demonstrates that C9 resins can be prepared with cesium modified heteropolyacids.

A 500 milliliter three neck flask was equipped with a cooling jacket, overhead stirrer, reflux condenser, gas inlet and outlet ports, thermometer, and dropping addition funnel. The flask was charged with 66.2 grams of "LRO-90" (Lyondell Petrochemical Company, Houston, Tex.), 66.2 grams of "RHS", (Recycled Hydrogenation Solvent, Hercules Incorporated, Wilmington, Del.) (RHS being similar to "OMS", Organic Mineral Spirits, Exxon Chemical Company, Houston, Tex.), and 100 grams of toluene (reagent grade, Aldrich, Milwaukee, Wis.). The LRO and RHS had been mixed prior to the reaction and dried over anhydrous calcium chloride (reagent grade, Aldrich, Milwaukee, Wis.). The toluene was dried over 3 angstrom molecular sieves prior to use.

The catalyst, 6.12 grams of $Cs_{2.9}H_{0.1}PW_{12}O_{40}$, was dried at 200° C. for 30 minutes. A portion of the catalyst, 3.0 grams, was added to initiate the reaction. The reaction temperature was maintained at 10° C. and 0.75 grams of additional catalyst added after 45 and 100 minutes. After 140 minutes, the reaction flask was heated to maintain 40° C. The total reaction time was 345 minutes.

At the end of the reaction, the catalyst was filtered from the resin solution. The resin solution was rotary evaporated with a final condition of 45 minutes with a bath temperature of 190° C. at <5 mm Hg. The resultant yield was 14.3 grams. The softening point of the resin was 65° C. The number average, weight average, and Z average molecular weights as determined by SEC were 421, 729, 1348.

While the invention has been described in connection with certain preferred embodiments so that aspects thereof may be more fully understood and appreciated, it is not intended to limit the invention to these particular embodiments. On the contrary, it is intended to cover all alternatives, modifications and equivalents as may be included within the scope of the invention as defined by the appended claims.

What is claimed is:

1. A process for making a hydrocarbon resin, comprising polymerizing a feed stream comprising at least one member selected from the group consisting of pure monomer, C5 monomers, and C9 monomers in the presence of a metal oxide solid acid catalyst comprising heteropolyacid intercalated clay to produce a hydrocarbon resin, wherein substantially all freely-associated water has been removed from the heteropolyacid intercalated clay.

2. The process of claim 1, wherein water removal from the metal oxide solid acid catalyst comprises calcining at a temperature up to about 700° C.

3. The process of claim 1, wherein the heteropolyacid comprises at least one member selected from the group consisting of tungstophosphoric acid, tungstosilicic acid, molybdophosphoric acid, and molybdosilicic acid.

4. The process of claim 3, wherein the heteropolyacid comprises $Cs_nH_{(3-n)}PW_{12}O_{40}$ where n=2 to less than 3.

5. The process of claim 1, wherein the feed stream comprises at least pure monomer, and wherein the pure monomer comprises at least one member selected from the group consisting of styrene, alpha-methyl styrene, beta-methyl, styrene, 4-methyl styrene, and vinyl toluene fractions.

6. The process of claim 1, wherein the feed stream comprises at least C5 monomers comprising at least one member selected from the group consisting of isobutylene, 2-methyl-2-butene, 1-pentene, 2-methyl-1-pentene, 2-methyl-2-pentene, 2-pentene, cyclopentene, cyclohexene, 1,3-pentadiene, 1,4-pentadiene, isoprene, 1,3-hexadiene, 1,4-hexadiene, cyclopentadiene, and dicyclopentadiene.

7. The process of claim 1, wherein the feed stream comprises at least C9 monomers comprising at least one member selected from the group consisting of styrene, vinyl toluene, indene, dicyclopentadiene, and alkylated derivatives thereof.

8. The process of claim 1, wherein the feed stream is contacted with about 0.1 wt % to 30 wt % of the metal oxide solid acid catalyst based on monomer weight in a batch reactor.

9. The process of claim 1, wherein the metal oxide solid acid catalyst is added to the feed stream.

10. The process of claim 1, wherein the feed stream is added to a slurry of the metal oxide solid acid catalyst in solvent.

11. The process of claim 1, wherein the feed stream is polymerized at a reaction temperature between about −50° C. and 150° C.

12. The process of claim 1, wherein the feed stream comprises at least pure monomer, and wherein the hydrocarbon resin has a number average molecular weight (Mn) ranging from about 400 to 2000, a weight average molecular weight (Mw) ranging from about 500 to 5000, a Z average molecular weight (Mz) ranging from about 500 to 10,000, and a polydispersity (PD) as measured by Mw/Mn between about 1.2 and 3.5, where Mn, Mw, and Mz are determined by size exclusion chromatography (SEC).

13. The process of claim 1, wherein the feed stream comprises at least C5 monomers, and wherein the hydrocarbon resin has a number average molecular weight (Mn) of about 400 to 2000, a weight average molecular weight (Mw) of about 500 to 3500, a Z average molecular weight (Mz) of about 700 to 15,000, and a polydispersity (PD) as measured by Mw/Mn between about 1.2 and 5, where Mn, Mw, and Mz are determined by size exclusion chromatography (SEC).

14. The process of claim 1, wherein the feed stream comprises at least C9 monomers, and wherein the hydrocarbon resin has a number average molecular weight (Mn) of about 400 to 1200, a weight average molecular weight (Mw) of about 500 to 2000, a Z average molecular weight (Mz) of about 700 to 6000, and a polydispersity (PD) as measured by Mw/Mn between about 1.2 and 3.5, where Mn, Mw, and Mz are determined by size exclusion chromatography (SEC).

15. The process of claim 5, wherein n=2.50 to 2.98.

16. The process of claim 1, wherein the heteropolyacid comprises tungstophosphoric acid.

17. The process of claim 1, wherein the heteropolyacid comprises tungstosilicic acid.

18. The process of claim 1, wherein the heteropolyacid comprises molybdophosphoric acid.

19. The process of claim 1, wherein the heteropolyacid comprises molybdosilicic acid.

20. The process of claim 12, wherein the water removal from the metal oxide solid acid catalyst comprises calcining at a temperature up to about 700° C., wherein the heteropolyacid comprises $Cs_nH_{(3-n)}PW_{12}O_{40}$ where n=2 to less than 3, wherein the pure monomer comprises at least one member selected from the group consisting of styrene, alpha-methyl styrene, beta-methyl styrene, 4-methyl styrene, and vinyl toluene fractions, and wherein the feed stream is polymerized at a reaction temperature between about −50° C. and 150° C.

21. The process of claim 13, wherein the water removal from the metal oxide solid acid catalyst comprises calcining at a temperature up to about 700° C., wherein the heteropolyacid comprises $Cs_nH_{(3-n)}PW_{12}O_{40}$ where n=2 to less than 3, wherein the C5 monomers comprise at least one member selected from the group consisting of isobutylene, 2-methyl-2-butene, 1-pentene, 2-methyl-1-pentene, 2-methyl-2-pentene, 2-pentene, cyclopentene, cyclohexene, 1,3-pentadiene, 1,4-pentadiene, isoprene, 1,3-hexadiene, 1,4-hexadiene, cyclopentadiene, and dicyclopentadiene, and wherein the feed stream is polymerized at a reaction temperature between about −50° C. and 150° C.

22. The process of claim 14, wherein the water removal from the metal oxide solid acid catalyst comprises calcining at a temperature up to about 700° C., wherein the heteropolyacid comprises $Cs_nH_{(3-n)}PW_{12}O_{40}$ where n=2 to less than 3, wherein the C9 monomers comprise at least one member selected from the group consisting of styrene, vinyl toluene, indene, dicyclopentadiene, and alkylated derivatives thereof, and wherein the feed stream is polymerized at a reaction temperature between about −50° C. and 150° C.

* * * * *